(12) United States Patent
Kobayashi

(10) Patent No.: US 7,738,029 B2
(45) Date of Patent: Jun. 15, 2010

(54) IMAGE-TAKING APPARATUS THAT SHOOTS A STILL IMAGE WHEN A RELEASE BUTTON IS PRESSED

(75) Inventor: Koji Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1192 days.

(21) Appl. No.: 11/329,238

(22) Filed: Jan. 11, 2006

(65) Prior Publication Data
US 2006/0170812 A1 Aug. 3, 2006

(30) Foreign Application Priority Data
Feb. 3, 2005 (JP) .............................. 2005-027840

(51) Int. Cl.
G03B 7/00 (2006.01)
(52) U.S. Cl. ............... 348/362; 348/229.1; 348/363; 348/364; 348/366; 348/348; 348/349; 348/350
(58) Field of Classification Search ................. 348/345, 348/229.1, 362, 363, 364, 366, 348, 349, 348/350, 220.1
See application file for complete search history.

(56) References Cited

U.S. PATENT DOCUMENTS

| | | | | |
|---|---|---|---|---|
| 4,629,305 A | * | 12/1986 | Sato et al. | 396/212 |
| 5,194,960 A | * | 3/1993 | Ota | 348/362 |
| 5,255,048 A | * | 10/1993 | Labaziewicz | 396/60 |
| 5,457,512 A | * | 10/1995 | Kondo | 396/111 |
| 7,012,638 B1 | * | 3/2006 | Yokonuma | 348/220.1 |
| 2002/0003579 A1 | * | 1/2002 | Inagaki | 348/312 |
| 2003/0095192 A1 | * | 5/2003 | Horiuchi | 348/222.1 |

FOREIGN PATENT DOCUMENTS

| | | |
|---|---|---|
| JP | 2-30633 B2 | 7/1990 |
| JP | 2-30634 B2 | 7/1990 |
| JP | 06205280 A * | 7/1994 |

* cited by examiner

Primary Examiner—Lin Ye
Assistant Examiner—Temitope Adeyiga
(74) Attorney, Agent, or Firm—Birch, Stewart, Kolasch & Birch, LLP

(57) ABSTRACT

The present invention relates to an image-taking apparatus such as a digital camera which is equipped with a release button and shoots a still image when the release button is pressed. It can perform proper metering for still images and reduce a time lag between a half press and the time when it is ready to shoot a still image. The image-taking apparatus has a through image display section which displays a through image which is moving images for display before a half press, a metering section which performs both metering for a through image and metering for a still image before the half press, a distance measuring section which measures distance in response to a half press, and a shooting section which shoots a still image in response to a full press.

11 Claims, 23 Drawing Sheets

IMAGE-TAKING APPARATUS THAT SHOOTS A STILL IMAGE WHEN A RELEASE BUTTON IS PRESSED

BACKGROUND OF THE INVENTION

1. Field of the Invention

The present invention relates to an image-taking apparatus such as a digital camera or camera phone which is equipped with a release button and shoots a still image when the release button is pressed.

2. Description of the Related Art

Recently, instead of conventional film-based cameras, digital cameras which obtain image data of subjects focused on an image pickup element such as a CCD element as well as cell phones equipped with such a digital camera have come into wide use. Hereinafter, such cameras will be collectively or representatively referred to as digital cameras.

One of the problems with digital cameras is a time lag between a photographer's shooting action and actual shooting. Many of commercially available digital cameras have large time lags, often resulting in missing the right moment to take a photo.

To reduce such time lags, Japanese Patent Laid-Open No. 2-30633 and Japanese Patent Laid-Open No. 2-30634 disclose techniques for exposure control using results of metering for movie shooting by omitting metering for still-image shooting upon switching from movie shooting to still-image shooting.

However, in the case of movie shooting, light metering (hereafter referred to as metering) is performed on a frame-by-frame basis and the result of metering is used for exposure control of subsequent frames (few frames later). This requires quick metering, and metering is not performed over a wide range of field luminance suitable for still shooting. Recently, in particular, an image pickup element which has multiple photosensors with different areas per pixel and a wide dynamic range has made its debut. When shooting still images at correct exposure making-full use of an image pickup element with such a wide dynamic range, it is impracticable to apply results of metering for movie shooting to still-image shooting.

Thus, in order to perform proper metering for still-image shooting, a two-step release button which lends itself to a half press and full press is used with a sequence which consists of displaying a through image, i.e., moving-images for display, in normal state, performing detailed metering for still-image shooting in response to a half press, and shooting a still image in response to a full press.

In this case however, it takes time to complete metering for still-image shooting after a half press, presenting the problem of a time lag.

SUMMARY OF THE INVENTION

The present invention has been made in view of the above circumstances and provides an image-taking apparatus which can perform proper metering for still images with a reduced time lag between a half press and the time when it is ready to shoot a still image.

The present invention provides an image-taking apparatus which is equipped with a release button and shoots a still image when the release button is pressed, wherein:

the release button is a two-step type which lends itself to a half press and full press; and the image-taking apparatus has:

through image display means which displays a through image which is moving images for display before a half press, metering means which performs both metering for a through image and metering for a still image before a half press, the metering for a still image covering a wider luminance range than the metering for a through image, in-focus position detecting means which detects an in-focus position in response to a half press, and shooting means which shoots a still image in response to a full press.

With the image-taking apparatus according to the present invention, since the metering means performs both metering for a through image and metering for a still image before a half press, it is possible to reduce a time lag between the half press and the time when it is ready to shoot a still image.

In the image-taking apparatus according to the present invention, preferably the metering means has a second metering mode in which metering for a through image is performed before a half press and metering for a still image is performed after the half press, in addition to a first metering mode in which both metering for through image display and metering for a still image are performed before a half press.

The same sequence as the conventional one (the second metering mode) consumes less power than the first metering mode, and preferably it is possible to switch the modes between cases in which importance is attached to take a photo in the right moment and cases in which it is desired to reduce power consumption.

In the image-taking apparatus according to the present invention, preferably the metering means generates a series of image frames in the first metering mode by placing one each of multiple metering frames with cyclically differing amounts of exposure between adjacent through image frames for through image display, and performs the metering for a still image using a set of light measurements taken over a round of metering frames based on one metering frame in the series of image frames.

In order to perform high-accuracy metering for a still image, it is necessary to perform metering more than once at different exposures. By placing one each of multiple metering frames with cyclically differing amounts of exposure between adjacent through image frames for through image display, the first metering mode allows metering for a still image without obstructing through image display.

Preferably the image-taking apparatus according to the present invention has a variable aperture member which limits quantity of photographic light, wherein if there is an aperture change in the first metering mode, the metering means discards results of light measurements obtained before the aperture change and performs metering for a still image based only on metering frames after the aperture change.

A change in the aperture means that the field luminance is unstable or that the field luminance has changed. On the other hand, since the metering for a still image consists of multiple light measurements, the field luminance needs to be stable throughout the multiple light measurements. Thus, in case of any aperture change, the metering for a still image can be performed with high accuracy if it is performed based only on the metering frames after the aperture change by discarding the results of light measurements obtained before the aperture change.

In the image-taking apparatus according to the present invention, preferably in the first metering mode, the metering means performs the metering for a through image based on through image frames in the series of image frames.

The through image is a type of moving image and requires quick metering. Besides, through image frames are more stable in the amount of exposure than metering frames with varied amounts of exposure. Thus, preferably the metering for a through image is performed based on through image frames as is conventionally the case.

In the image-taking apparatus according to the present invention, preferably the metering means determines in the first metering mode whether the metering for a still image is finished in response to a half press, and takes only unfinished light measurements after the half press if the metering is not finished.

For example, even if metering results so far are discarded due to an aperture change or if metering for a still image is not completed at the time of a half press because the time from power-on to the half press is too short, the still image can be shot with proper metering if unfinished light measurements are taken after the half press although this causes a little longer time lag.

If no light measurement is finished at the time of a half press, all the light measurements are performed after the half press.

In the image-taking apparatus according to the present invention, preferably:

the shooting means can shoot in a plurality of shooting modes including a low-light shooting mode which requires metering of a low-light range in which metering based on the metering frames is not possible; and the metering means performs metering in the low-light range after a half press in the low-light shooting mode which is the first metering mode.

A low-light shooting mode such as a night mode requires the luminance of a dark subject field to be metered, and such metering requires a long exposure. On the other hand, during through image display before a half press, a low frame rate for a series of image frames will obstruct smooth thorough image display. Thus, in the case of metering which requires a long exposure, by performing it after a half press, it is possible to avoid obstructing through image display before the half press, perform metering suitable for the low-light shooting mode, and thereby provide a balanced sequence as a whole although there is a little longer time lag in the low-light shooting mode.

In the image-taking apparatus according to the present invention, preferably an automatic sensitivity setting mode is provided which automatically switches between sensitivity for still-image shooting and sensitivity for through image generation and which maintains constant sensitivity while a round of metering frames are generated in the first metering mode.

Conventional digital cameras have a function to adjust sensitivity by adjusting an amplification factor of a signal from an image pickup element as well as an auto-sensitivity metering mode in which the sensitivity is changed automatically according to field luminance and the like. On the other hand, metering for a still image requires multiple metering frames with varied amounts of exposure, and any difference in sensitivity among the multiple metering frames can prevent accurate metering. According to the present invention, even in the case of the auto-sensitivity metering, the first metering mode allows high-accuracy metering for a still image because constant sensitivity is maintained while a round of metering frames are generated.

In the image-taking apparatus according to the present invention, the shooting means has an aperture-lock shooting mode in which a still image is shot by maintaining the aperture determined at the time of a half press.

The aperture available at the time of a half press is the one set when the metering for a still image is performed. By shooting a still image with the aperture maintained, it is possible to adjust the exposure with higher accuracy. Depending on the shooting mode, however, it is alternatively possible to use an aperture different from the one available at the time of a half press and shoot a still image by adjusting the shutter time and the like accordingly.

As described above, the present invention makes it possible to implement an image-taking apparatus which can perform high accuracy metering for a still image with a reduced time lag between a half press and the time when it is ready to shoot a still image, reducing the possibility of missing the right moment to take a photo.

BRIEF DESCRIPTION OF THE DRAWINGS

FIG. 4 is a diagram showing simultaneous S1/S2 depression sequences performed when a quick shooting mode is off and when the quick shooting mode is on;

FIG. 8 is a diagram showing a through image sequence when the quick shooting mode is on;

FIG. 9 is a diagram showing an operation sequence of a "low-light through image" when the quick shooting mode is on;

FIG. 10 is a metering diagram when the quick shooting mode is on;

FIG. 11 is a metering diagram when the iris aperture for a through image is F2.8 when the quick shooting mode is on;

FIG. 12 is a program chart for through image display when the quick shooting mode is on;

FIG. 13 is a program chart for a still image when the quick shooting mode is on;

FIG. 15 is a program chart for a still image in an auto sensitivity mode when the quick shooting mode is on;

FIG. 21 is a diagram showing a through image sequence performed in a shooting mode such as a night mode which involves low-light frame metering, when the quick shooting mode is on;

FIG. 22 is a diagram showing a sequence performed when S1 is pressed in a shooting mode such as a night mode which involves low-light frame metering, when the quick shooting mode is on.

DETAILED DESCRIPTION OF THE PREFERRED EMBODIMENTS

An embodiment of the present invention will be described below.

Figure 1:
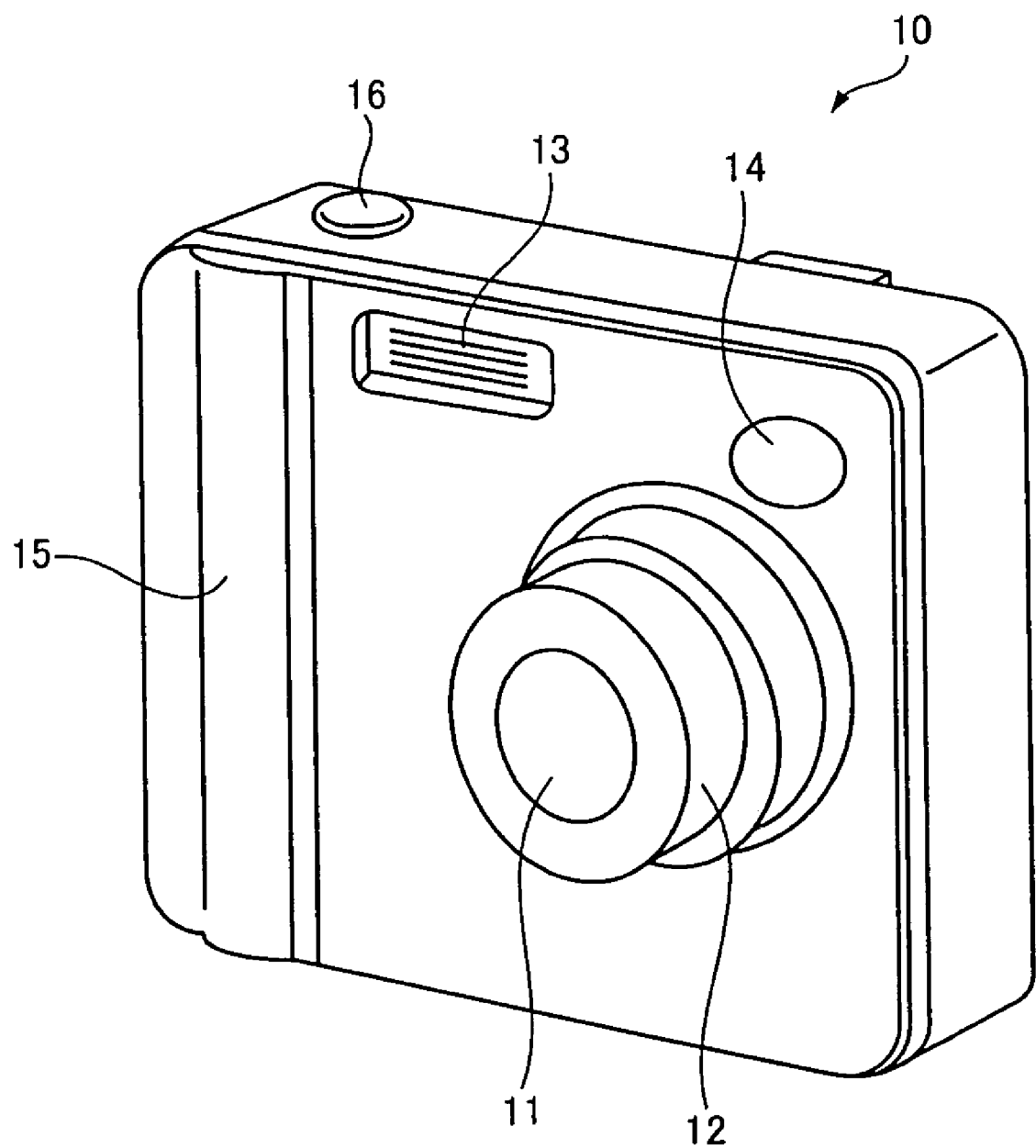
FIG. 1 is an external perspective view of a digital camera which is an embodiment of an image-taking apparatus according to the present invention, as viewed obliquely downward from the front.

FIG. 1 is an external perspective view of a digital camera which is an embodiment of an image-taking apparatus according to the present invention, as viewed obliquely downward from the front.

At the center in the front face of the digital camera 10 shown in FIG. 1, there is a lens barrel 12 which contains a taking lens 11 including an optical zoom lens. On an upper front part of the digital camera 10, there are a flash unit 13 which emits a flash in sync with a shot and an optical finder's objective window 14.

Also, on the left front face of the digital camera 10, there is a slide-type power switch 15.

Furthermore, on the top face of the digital camera 10, there is a release button 16.

Figure 2:
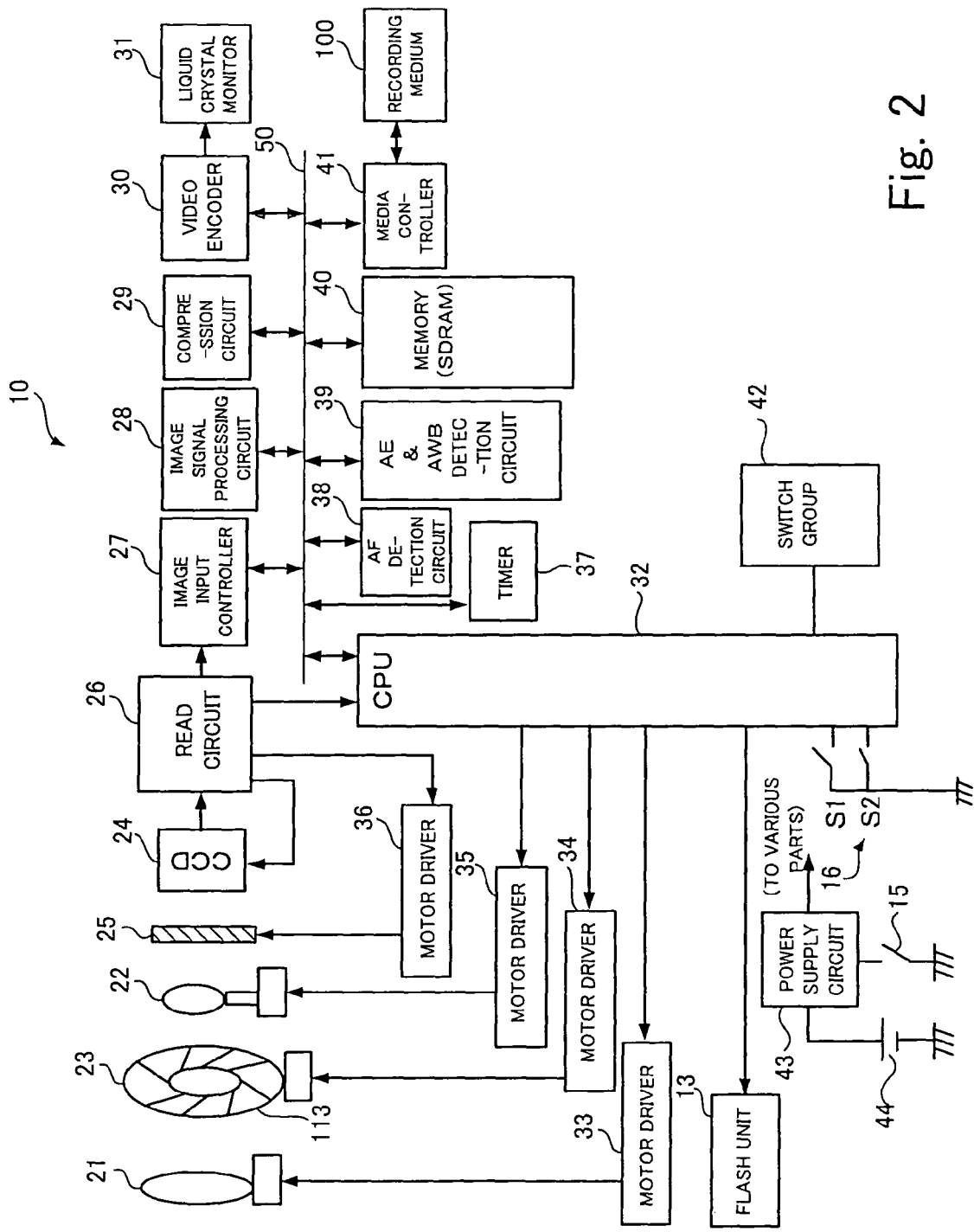
FIG. 2 is a block diagram showing a circuit configuration of the digital camera shown in FIG. 1.

FIG. 2 is a block diagram showing a circuit configuration of the digital camera 10 shown in FIG. 1.

The digital camera 10 is equipped with a zoom lens 21 and focus lens 22 which compose the taking lens 11, an iris 23 which allows stepwise adjustment of the aperture, a CCD image pickup element 24 (hereinafter referred to as the "CCD") which receives a subject image formed through the taking lens (zoom lens 21 and focus lens 22) and iris 23 and generates an analog signal, and a mechanical shutter 25 which limits the length of time during which the CCD 24 is exposed to the light from the subject entering through the taking lens and iris 23.

Also, the digital camera 10 is equipped with a read circuit 26 consisting of a timing generator which controls timings such as electronic-shutter timing of the CCD 24 and read timing of an image signal and an A/D converter circuit which converts an analog signal read out of the CCD 24 into a digital image signal, an image input controller 27 which transmits the digital image signal from the read circuit 26 to a busline 50, and an image signal processing circuit 28 which converts the digital image signal inputted via the busline 50 into a YC signal represented by luminance (Y) and color (C).

Furthermore, the digital camera 10 is equipped with a compression circuit 29 which compresses the YC signal inputted via the busline 50 and a video encoder 30 which converts the YC signal inputted via the busline 50 into an NTSC (National TV Standards Committee) signal. The NTSC signal outputted from the video encoder 30 is supplied to a liquid crystal monitor (hereinafter referred to as the "LCD") 31 to display images on the LCD 31.

Also, the digital camera 10 is equipped with a CPU 32 which controls the entire digital camera 10; motor drives 33 to 36 which drive the zoom lens 21, iris 23, focus lens 22, and mechanical shutter 25, respectively; and switches S1 and S2 which are turned on at the press of the release button 16. One (S1) of the two switches S1 and S2 is turned on when the release button 16 is half-pressed while the other switch S2 is turned on when the release button 16 is full-pressed. Hereinafter the state in which the release button 16 is half-pressed will be referred to as an "S1 state" and the state brought about when the release button 16 is full-pressed will be referred to as an "S2 state." Besides, the state, in which the digital camera 10 is in a shooting mode with the power on but the release button 16 is not pressed yet, will be referred to as an "S0 state."

Furthermore, the digital camera 10 is equipped with a timer 37 for use to count various types of time, an AF detection circuit 38 which detects an in-focus position by sensing contrast based on the digital image signal, an AE & AWB detection circuit 39 which detects field luminance and white balance based on the digital image signal, a memory (SDRAM) 40 which temporarily stores the digital image signal, and a media controller 41 which records the image signal compressed by the compression circuit 29 in a portable recording medium 100.

Furthermore, the digital camera 10 is equipped with a switch group 42 consisting of various switches for use to switch between a shooting mode for taking a shot when the release button 16 is pressed and a playback mode for reading photographed images from the recording medium 100 and displaying them on the liquid crystal monitor 31, to switch among various shooting modes, to change sensitivity, and to extend the zoom lens; the power switch 15 also shown in FIG. 1; a power supply circuit 43 which supplies power to various parts, being controlled by on/off operations of the power switch 15; a battery 44 which serves as a power source to supply power to the power supply circuit 43; and the flash unit 13 (also shown in FIG. 2) which emits a flash in sync with a shot.

Figure 3:
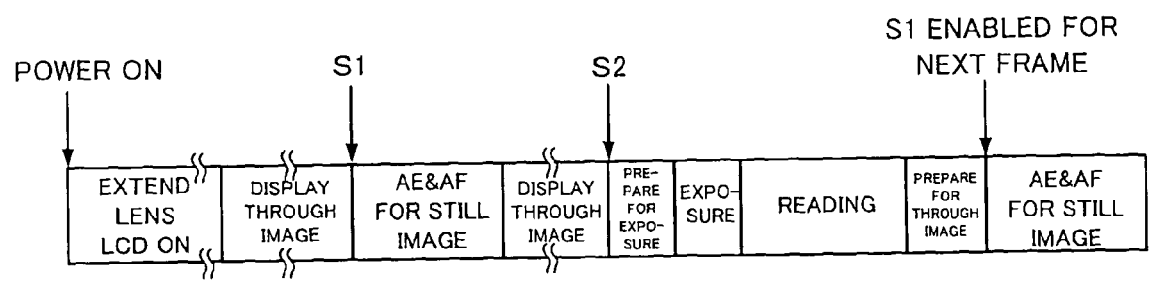
FIG. 3 is a diagram showing a typical shooting sequence of the digital camera shown in FIGS. 1 and 2.

FIG. 3 is a diagram showing a typical shooting sequence of the digital camera shown in FIGS. 1 and 2.

When the power is turned on (ON), the taking lens is extended and LCD 31 (see FIG. 2) is turned on to display a through image which is moving images for display. Subsequently, when the release button is half-pressed, bringing about the S1 state, metering is performed to determine an exposure for a still image (AE) and an in-focus position is determined (AF). When the AE and AF are finished, the through image is displayed again. In this state, when the release button is full-pressed (bringing about the S2 state), the read circuit 26 shown in the block diagram of FIG. 2 makes preparations for an exposure such as converting a timing clock to be supplied to the CCD 24 into a timing clock for a still image. Upon completion of the preparations, an exposure is made. Subsequently, the image signal is read out of the CCD 24, and then preparations for through image display are made including converting the timing clock to be supplied to the CCD 24 into a timing clock for the through image. Then the release button is ready to be pressed for a next shot.

With the typical shooting sequence shown in FIG. 3, it takes time before it is ready to actually take a shot (the S2 state) after the user half-presses the release button to take a shot (the S1 state), resulting in the possibility of missing the right moment to take a photo. The digital camera 10 shown in FIGS. 1 and 2 provides not only the shooting mode based on the shooting sequence shown in FIG. 3, but also a quick shooting mode which shortens the time between the S1 state and S2 state, thereby reducing the possibility of missing the right moment to take a photo.

Figure 4:
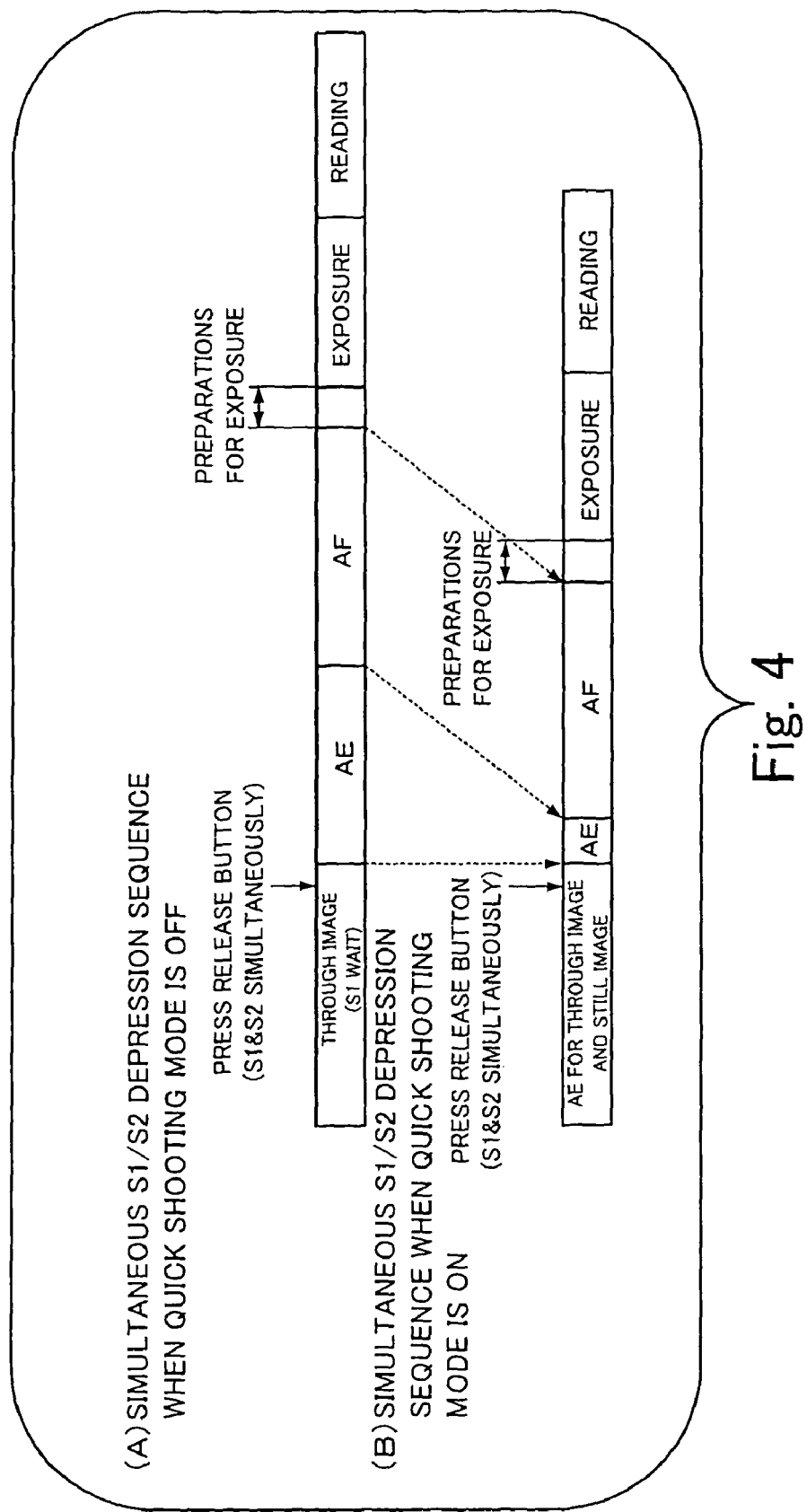

FIG. 4 is a diagram showing simultaneous S1/S2 depression sequences performed when the quick shooting mode is off (A) and when the quick shooting mode is on (B). The simultaneous S1/S2 depression means full-pressing (the S2 state) the shutter button in one stroke.

When the quick shooting mode is off as shown in Part (A) of FIG. 4, a through image is displayed and upon depression of the release button, the AE and AF for a still image are performed. Then preparations for an exposure are made, an exposure is made, and an image signal is read out of the CCD.

On the other hand, when the quick shooting mode is on as shown in Part (B) of FIG. 4, in the S0 state before depression of the release button, AE for a still image is performed while a through image is generated and displayed. When the release button is pressed, AF, preparations for an exposure, an exposure, and reading are performed omitting most of AE-related operations after the depression of the release button except some operations such as establishment of a program chart based on the results of AE performed in the S0 state.

If Parts (A) and (B) of FIG. 4 are compared, when the quick shooting mode is on (Part (B) of FIG. 4), since AE for a still image is performed in the S0 state while a through image is generated and displayed, the time lag between the time when the release button is pressed and the time when a shot is actually taken (an exposure is made) is shortened, reducing the possibility of missing the right moment to take a photo.

Although simultaneous S1/S2 depression of the release button has been described above, the time required for the AE and AF processes to be finished after the half press is shortened as well even when the release button is full-pressed after a short wait in a half-pressed state (S1 state).

According to this embodiment, when the quick shooting mode is on, since AE for a still image is performed in the S0 state before depression of the release button while a through image is generated and displayed, the frame rate in the S0 state is twice higher than when the quick shooting mode is off. This is a little disadvantageous in terms of power consumption, and thus this embodiment allows the quick shooting mode to be switched on and off.

Figure 5:
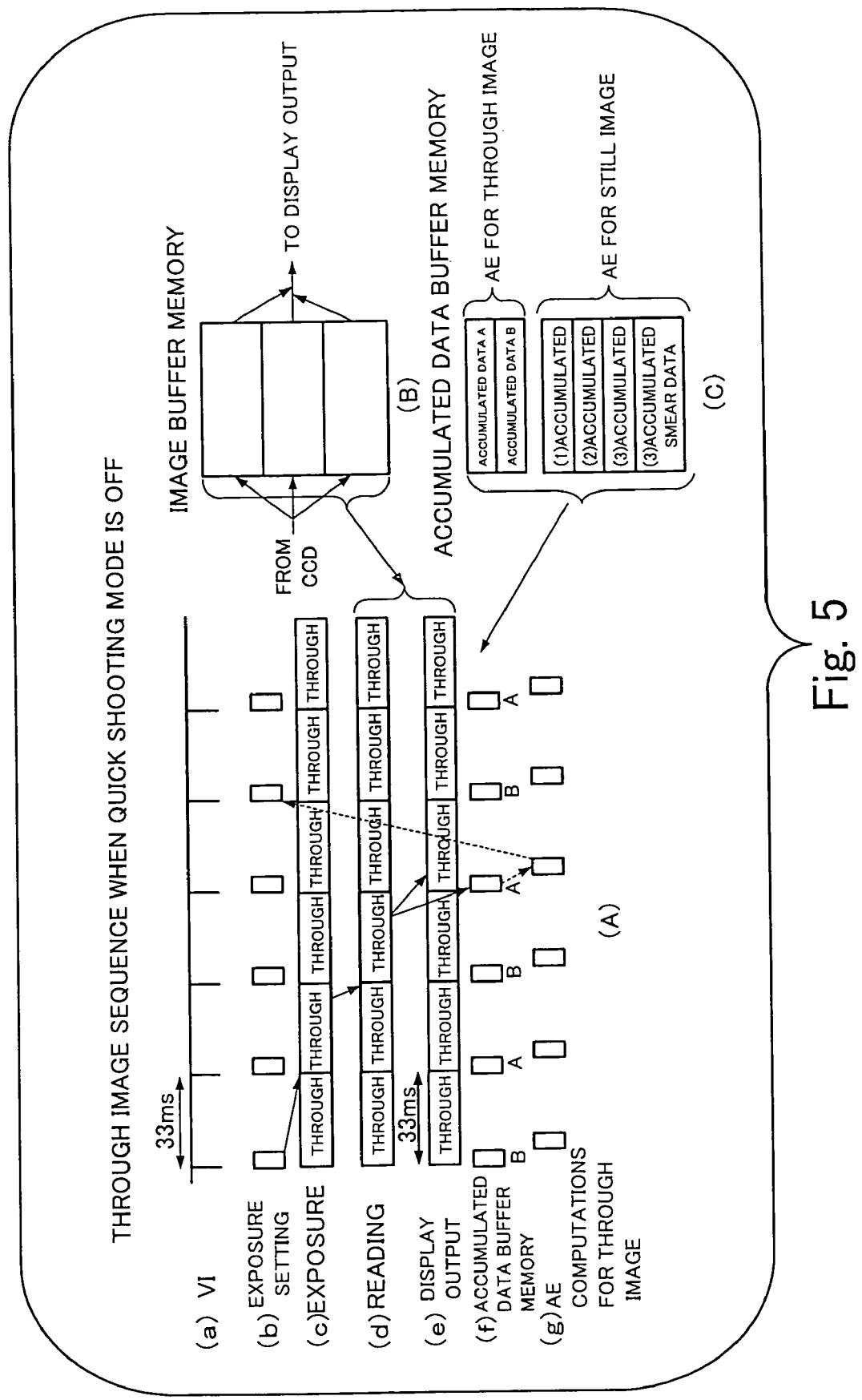
FIG. 5 is a diagram showing a through image sequence when the quick shooting mode is off.

FIG. 5 is a diagram showing a through image sequence when the quick shooting mode is off.

Part (A)-(a) of FIG. 5 shows a vertical synchronization signal, where an interval (33 ms, in this case) between adjacent pulses corresponds to a duration of each frame.

The sequence consists of making exposure settings (b), performing an exposure (c), reading from a CCD (d), and outputting a through image for display (e). To output a through image for display, as shown in Part (B) of FIG. 5, an image signal for the through image is stored and read cyclically on a frame-by-frame basis using three frames of image buffer memory prepared in advance. Signal values of the image signal for the through image read out of the CCD are accumulated for each of areas obtained by dividing the subject field and stored in accumulation buffers (f), AE computations for the through image are performed based on accumulated data stored in the accumulation buffers, and the results of AF computations are used for the next exposure settings. Two frames (accumulated data A and accumulated data B) of accumulated data buffer memory are provided for AE for a through image and are used alternately. Also, storage areas for four frames ((1) accumulated data, (2) accumulated data, (3) accumulated data, and (3) accumulated smear data) are provided for AE for a still image although they are not used here because a through image sequence in non-quick shooting mode is described here. The use of accumulated data buffer memory for AE for a still image will be described later.

In the S0 state when the quick shooting mode is off, the image signal for a through image is captured on a frame-by-frame basis at 33-ms intervals and used for display on a frame-by-frame basis as shown in FIG. 5. Also, AE computations are performed and used for the exposure settings a few frames later.

Figure 6:
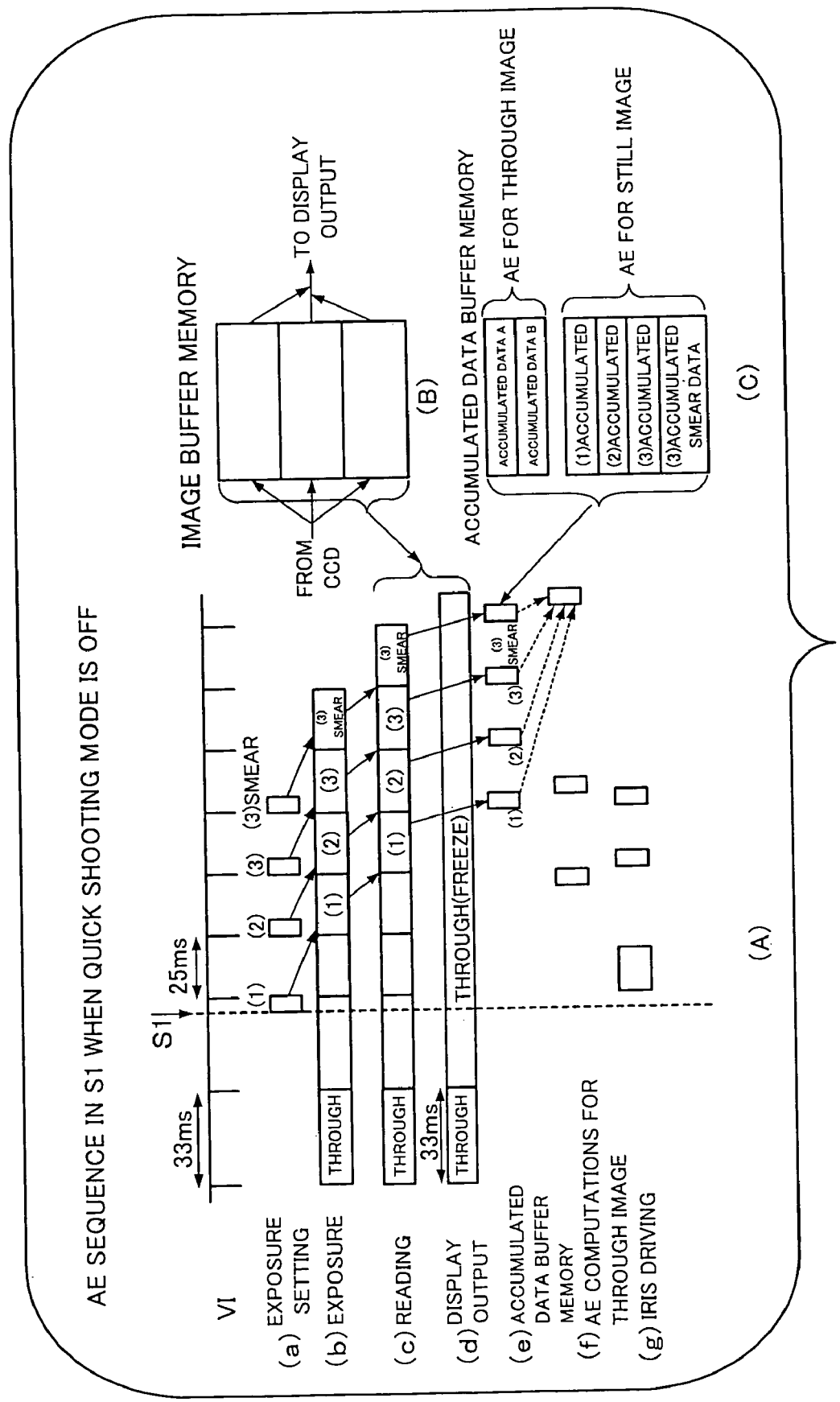
FIG. 6 is a diagram showing an AE sequence performed in a half-pressed state (S1 state) when the quick shooting mode is off.

FIG. 6 is a diagram showing an AE sequence performed in a half-pressed state (S1 state) when the quick shooting mode is off.

As shown in Part (A) of FIG. 6, when the release button is half-pressed (S1), the vertical synchronization signal starts to oscillate at 25-ms intervals, causing frames of the image signal to be captured at 25-ms intervals. Exposure settings for the accumulated data (1) (described later) are made and the aperture of the iris 23 (see FIG. 2) is adjusted to the exposure settings, exposure settings for the accumulated data (1) are made in the next frame after the iris ceases to be driven (b) because a frame exposed while the iris is being driven causing aperture changes is not usable, a read operation for the accumulated data (1) is performed (c), meanwhile the through image immediately before the half press continues to be displayed in a frozen state (d), the accumulated data is stored in the accumulated data buffer memory for the accumulated data (1) based on the image signal obtained by the read operation for the accumulated data (1) Similar processes are performed for the accumulated data (2), accumulated data (3), and accumulated smear data (3) in subsequent frames. The accumulated smear data (3) results from the same exposure as the accumulated data (3), but the charge accumulated in the CCD by the exposure is read out instead of being transferred to a transfer channel. It provides information about image-quality flaws known as smear. The information is used for smear correction. When the accumulated data (1) to (3) and accumulated smear data (3) are in place, AE computations for a still image are performed based on accumulated data and the resulting data is used for the exposure settings for the still image after a full press of the release button.

Figure 7:
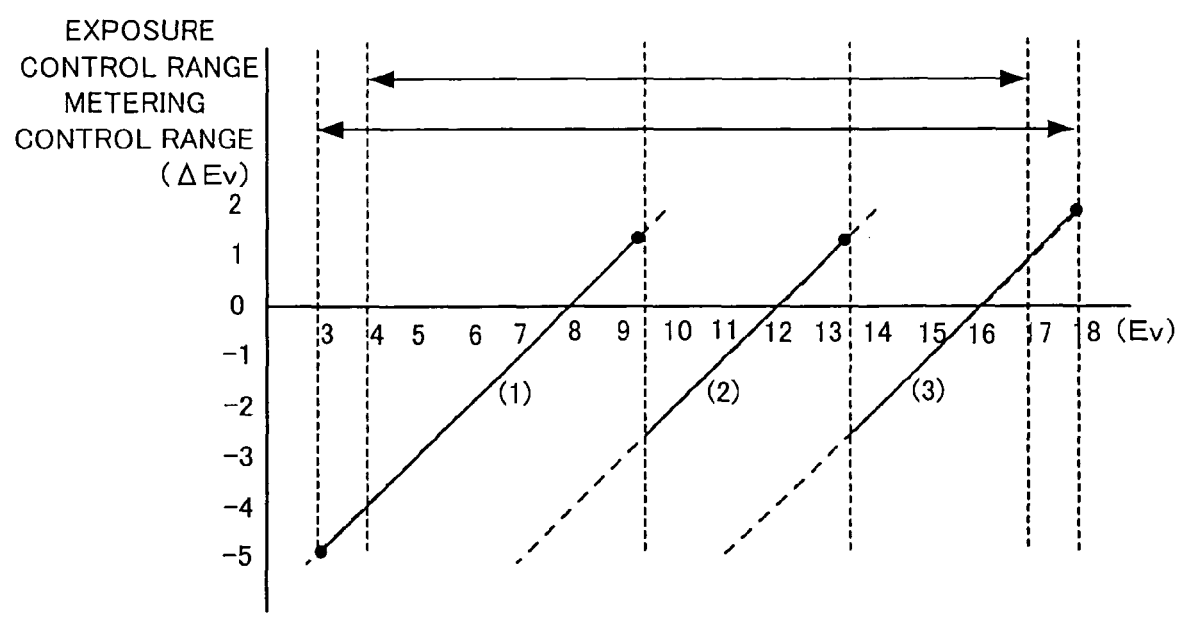
FIG. 7 is a metering diagram for a still image when the quick shooting mode is off.

FIG. 7 is a metering diagram for a still image when the quick shooting mode is off.

First, for the accumulated data (1), the iris aperture, electronic shutter speed, and the like are adjusted so that EV 8 will be a proper exposure, an exposure is made, and metering is performed for areas which fall within a range of EV 3 to EV 9.5 out of areas (e.g., 128 areas) obtained by dividing the subject field. Next, for the accumulated data (2), the iris aperture, electronic shutter speed, and the like are adjusted so that EV 12 will be a proper exposure, an exposure is made, and metering is performed for areas which fall within a range of EV 9.5 to EV 13.5. Then, for the accumulated data (3), the iris aperture, electronic shutter speed, and the like are adjusted so that EV 16 will be a proper exposure, an exposure is made, and metering is performed for areas which fall within a range of EV 13.5 to EV 18. Consequently, metering is performed for all the areas except when the subject field is particularly dark. Furthermore, for the accumulated smear data (3), an exposure is made under the same conditions as the accumulated data (3) and the charge accumulated by the exposure is read out without being transferred to the transfer channel. For a still image, metering is performed for a wide luminance range using four frames, AE computations for the still image are performed based on the results of metering (accumulated data) for the four frames, and the exposure value for the still image is determined. Here, the metering is performed in a range of EV 3 to EV 18, but the exposure value is adjusted within a range of EV 4 to EV 17.

Figure 8:
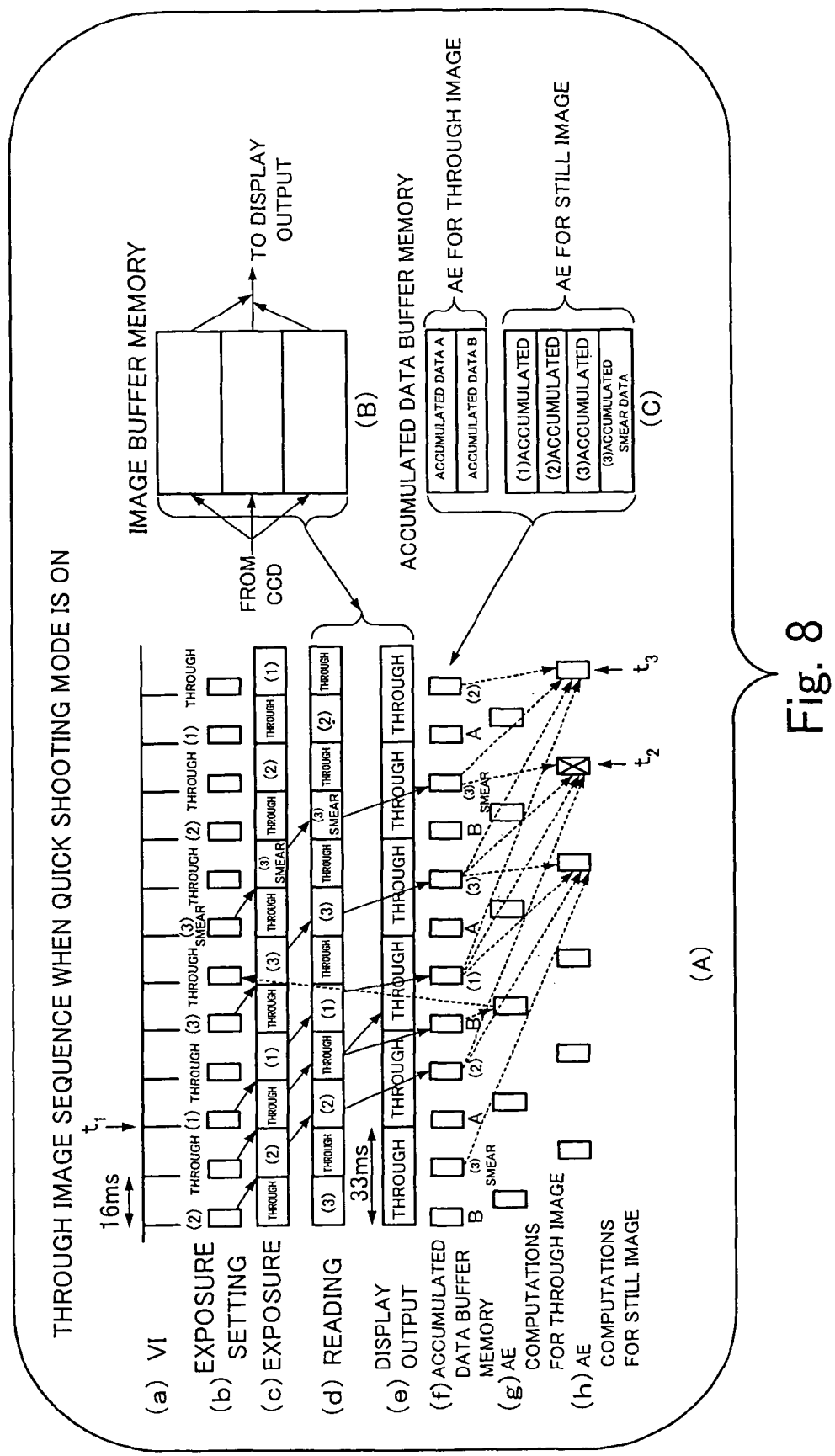

FIG. 8 is a diagram showing a through image sequence when the quick shooting mode is on.

Here, the duration of each frame is reduced to 16 ms (a) Exposure settings are made alternately for a through image and AE for a still image. Furthermore, still-image AE settings are made cyclically based on the accumulated data (2), accumulated data (1), accumulated data (3), and accumulated smear data (3).

Display output in Part (e) of FIG. 8 is created only for the frames exposed and read for the through image and is repeated at intervals (33 ms) (½ the frame rate) twice as long as the time (16 ms) required for exposure and reading of one frame.

Even in that case, the AE computations for the through image are performed based on the image signal for the through image similarly to the case where the quick shooting mode is off in FIG. 5. The AE computations for the still image are updated in sequence based on the latest four frames (the accumulated data (1) to (3) and accumulated smear data (3)) out of still-image AE frames arranged alternately with through image frames.

It is assumed here that the iris aperture is changed at time t1 as a result of exposure settings based on the AE for the through image. In that case, the results of AE computations for the still image at time t2 marked by X are discarded and results of AE computations performed at time t3 and later based on still-image AE frames subjected to exposure settings and exposures at time t1 and later become effective.

Figure 9:
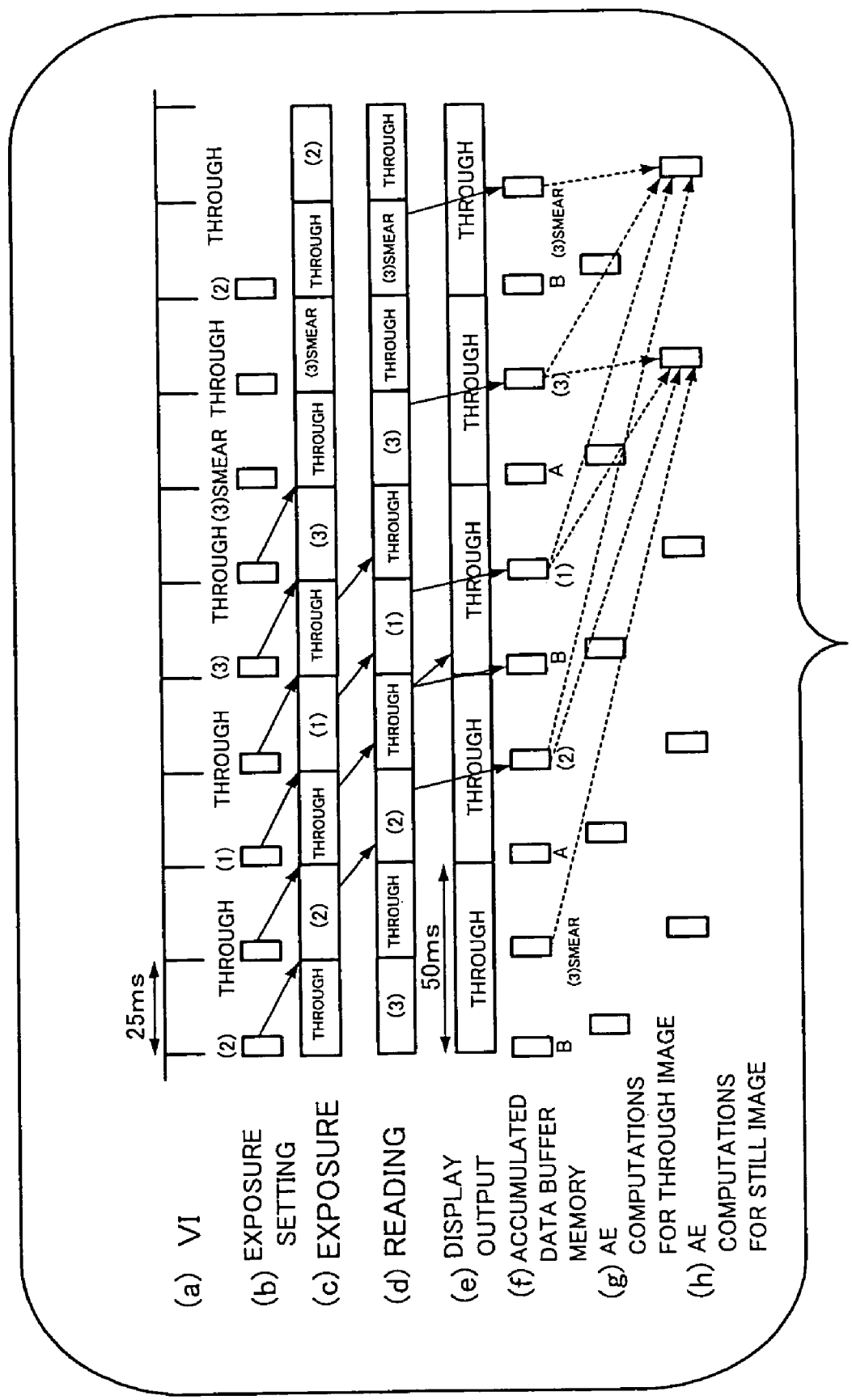

FIG. 9 is a diagram showing an operation sequence of a "low-light through image" when the quick shooting mode is on.

At a low luminance not higher than a predetermined luminance, a high frame rate makes it impossible to secure a sufficient exposure time within a frame and display a through image at a proper brightness. In such a situation, the duration of each frame is extended to 50 ms in low-light through image mode when the quick shooting mode is off. In FIG. 9, i.e., in the low-light through image mode when the quick shooting mode is on, the duration of each frame is 25 ms (a) which is half of 50 ms, the duration of each frame in the low-light through image mode when the quick shooting mode is off, and the display output lasts 50 ms, the same as in the low-light through image mode when the quick shooting mode is off. In this way, by using the same frame rate for display output both when the quick shooting mode is off and when the quick shooting mode is on, it is possible to ease the sense of incongruity felt when turning on and off the quick shooting mode.

Incidentally, the sequence itself in FIG. 9 is the same as the one in FIG. 8, i.e., the sequence for through image display used when the quick shooting mode is on, except for the duration of each frame, and thus further description of FIG. 9 will be omitted.

Figure 10:
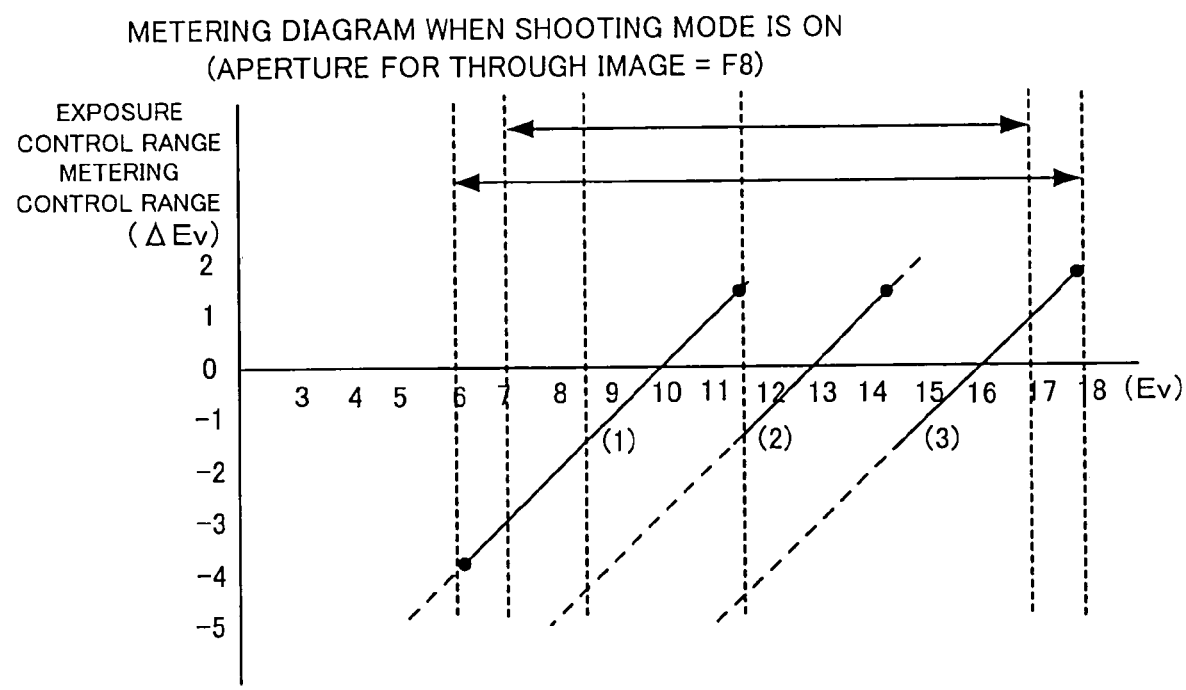

FIG. 10 is a metering diagram when the quick shooting mode is on.

When the quick shooting mode is on, since metering for a still image is performed with still-image metering frames arranged alternately with through image frames in the S0 state before a press of the release button, the iris aperture for the through image is used as it is. Consequently, the metering diagram for the through image in the S0 state varies with the iris aperture for the through image. FIG. 10 is a metering diagram when the iris aperture is F8, where the shutter speed and the like are adjusted with the aperture set at F8: adjustments are made so that EV 7 will be a proper exposure, an exposure is made, and metering is performed within a range of EV 6 to EV 11.5 in the case of the accumulated data (1); adjustments are made so that EV 13 will be a proper exposure, an exposure is made, and metering is performed within a range of EV 11.5 to EV 14 in the case of the accumulated data (2); adjustments are made so that EV 16 will be a proper exposure, an exposure is made, and metering is performed within a range of EV 14 to EV 16 in the case of the accumulated data (3); and an exposure is made under the same conditions as the accumulated data (3) and reading is performed for metering for the accumulated smear data in the case of the accumulated smear data (3). The subject field is bright to some extent when the aperture is F8, and thus metering is performed at EV 6 and above as shown in FIG. 10.

Figure 11:
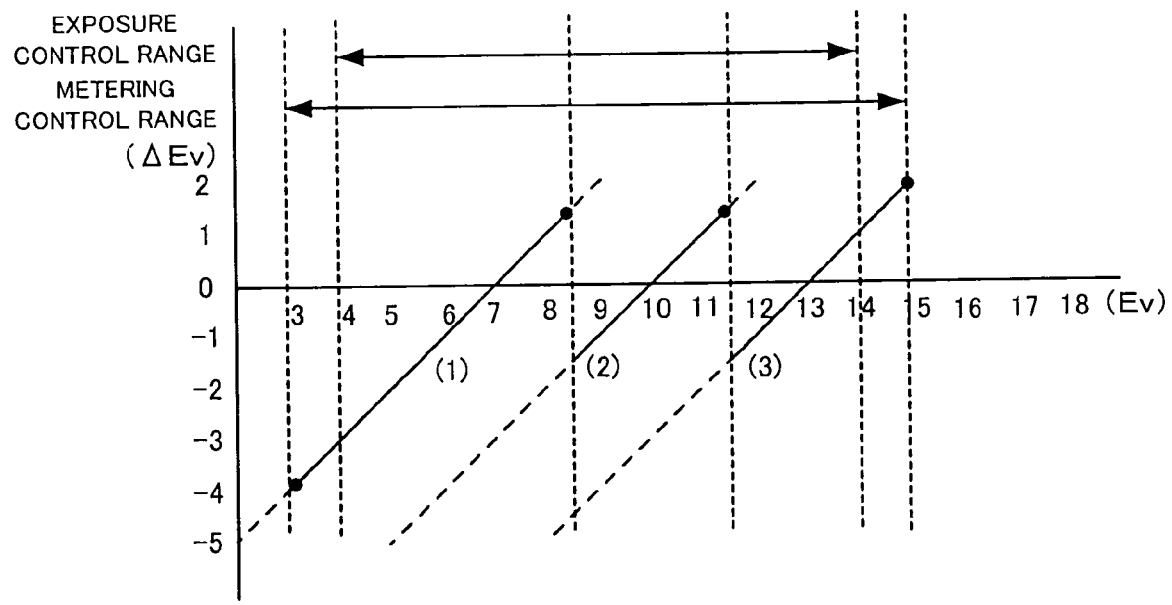

FIG. 11 is a metering diagram when the iris aperture for a through image is F2.8 when the quick shooting mode is on.

Since the aperture for the through image is F2.8, the subject field is fairly dark. Metering is performed in a range of EV 3 to EV 15 on the side of low luminance as shown in FIG. 11.

Figure 12:
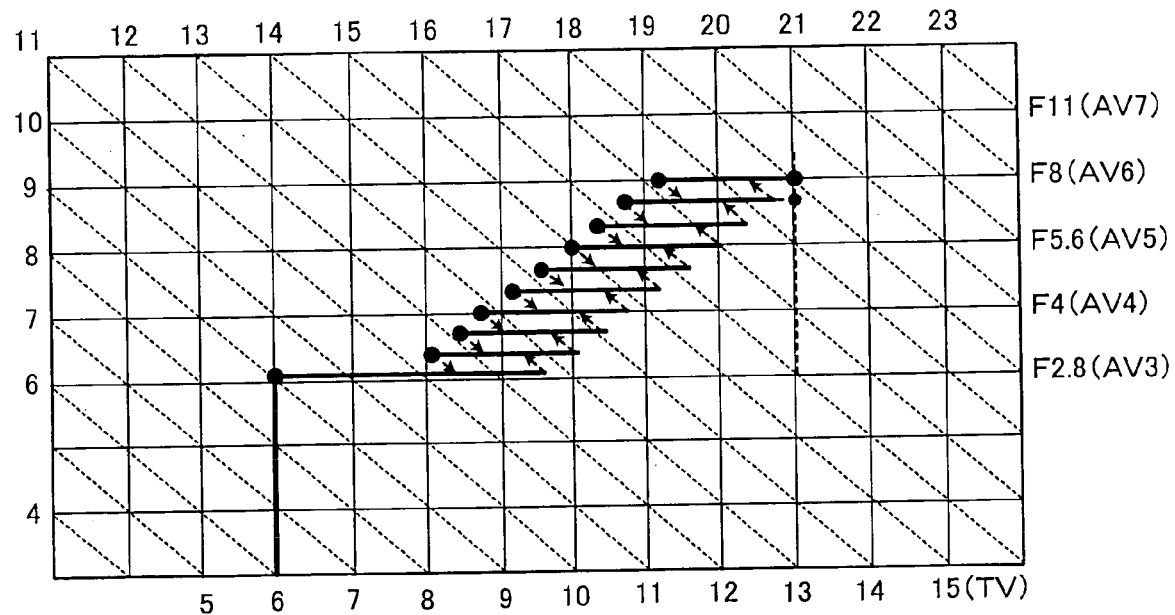

FIG. 12 is a program chart for through image display when the quick shooting mode is on.

As shown in FIG. 12, even if the brightness of the subject field changes, the exposure is adjusted using the shutter speed whenever possible with the aperture allowed to maintain hysteresis and change as little as possible.

As described with reference to FIG. 8, when the aperture changes, •AE computations for the still image are performed based solely on the frames after the change without using the still-image frames before the change, and thus aperture changes are minimized in the S0 state using a program chart such as the one shown in FIG. 12.

According to the program chart in FIG. 12, when brightness is lower than EV 9 at F2.8, the image signal read out of the CCD is amplified by adjusting amplifier gain to accommodate as low as EV 6.

Figure 13:
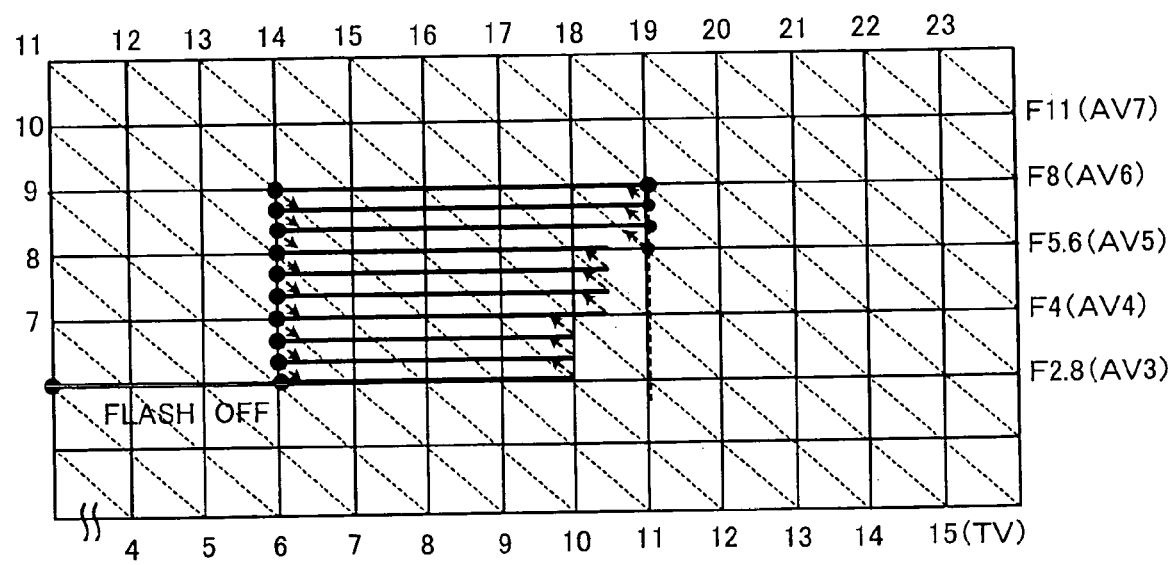

FIG. 13 is a program chart for a still image when the quick shooting mode is on.

In the program chart here, the aperture used for a through image before the release button is half-pressed (S0 state) continues over as wide a range as possible and a still image is shot using the aperture for the through image as it is. This makes it possible to shoot the still image at a more accurate exposure.

Figure 14:
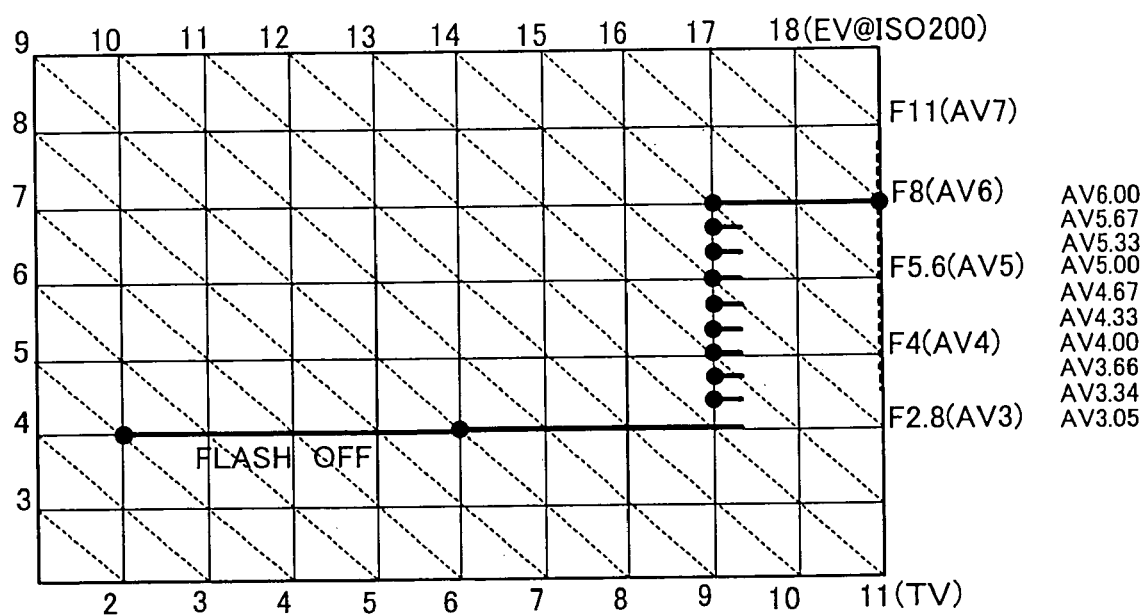
FIG. 14 is a program chart for still-image shooting in a sports mode.

FIG. 14 is a program chart for still-image shooting in a sports mode.

The digital camera according to this embodiment has a sports mode as one of shooting modes. In the sports mode, TV 9 is used over a wide range of luminance. In such a special mode the aperture is changed to suit TV 9 without being restricted to the aperture for the through image.

Figure 15:
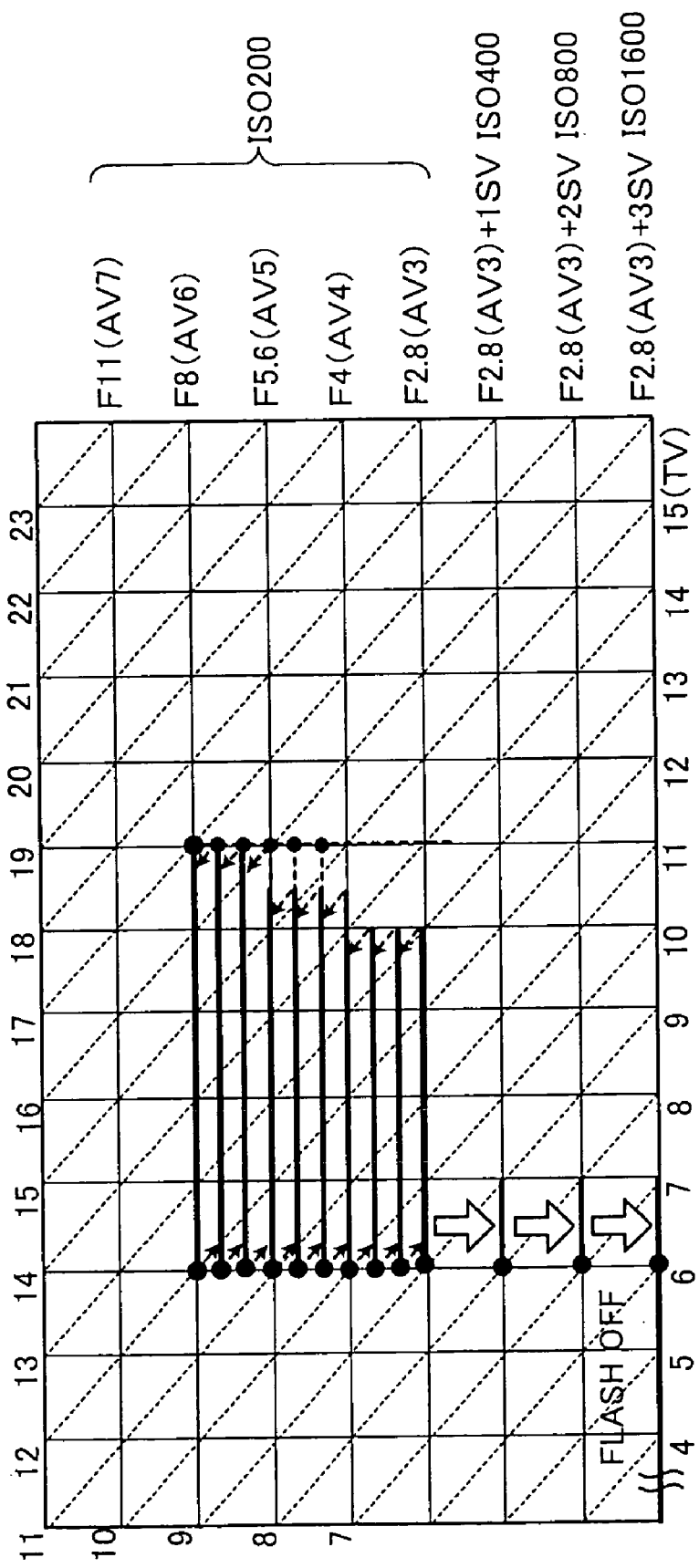

FIG. 15 is a program chart for a still image in an auto sensitivity mode when the quick shooting mode is on.

The digital camera according to this embodiment has an auto sensitivity mode in which sensitivity for a still image and sensitivity for a through image are changed in conjunction automatically.

Standard sensitivity for still images is set to ISO 200 and standard sensitivity for through images is set to ISO 100.

If field luminance is so low that correct exposure is not obtained even at F2.8 and TV 6 (lower than EV 9), the sensitivity is increased to a level equivalent to ISO 400 by increasing amplifier gain. If it is still dark, the sensitivity is increased to a level equivalent to ISO 800 by further increasing amplifier gain. If it is still dark, the sensitivity is increased to a level equivalent to ISO 1600 by further increasing amplifier gain.

The sensitivity is similarly changed automatically in the S0 state during through image shooting. While metering is performed four times for a set of the accumulated data (1) to (3) and accumulated smear data (3) (beginning with (2) and rotated in the order: medium-light metering (2), low-light metering (1), high-light metering (3), and metering for smear data (3)), the sensitivity is kept constant. If the sensitivity must be changed, it is changed after four times of metering is completed. By performing four times of metering at the same sensitivity, it is possible to take accurate measurements.

Figure 16:
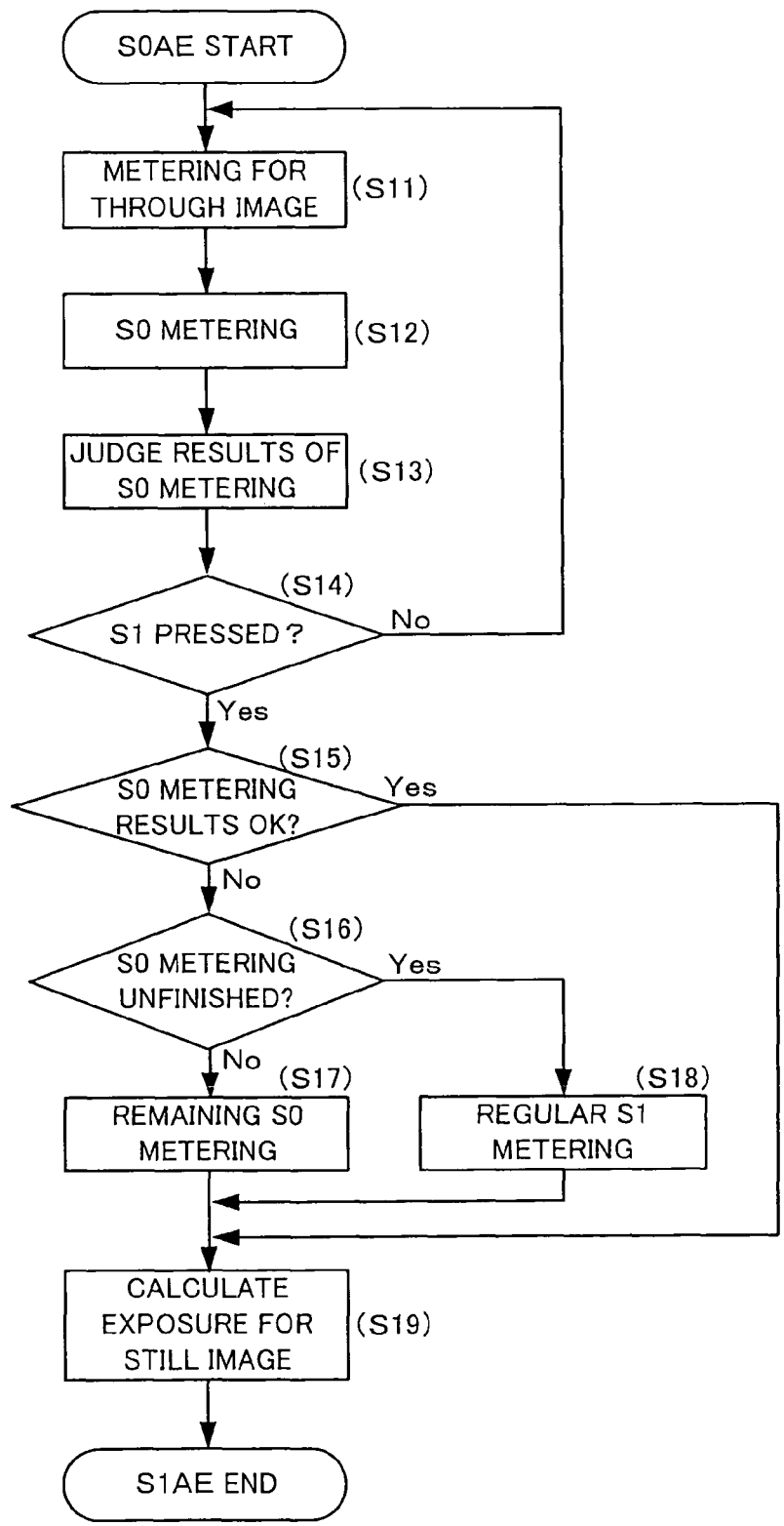
FIG. 16 is a flowchart showing a metering process for a still image when measurements for a through image in an S0 state is unstable.

FIG. 16 is a flowchart showing a metering process for a still image when measurements for a through image in the S0 state is unstable.

In the S0 state before a half press, metering for a through image (step S11) and metering for a still image (referred to as "S0 metering" because the metering for a still image is performed in the S0 state) are performed (step S12) and the results of S0 metering for the still image is judged (step S13). It is judged here whether the S0 metering is based on four times of metering performed when the aperture is stable.

The above sequence is repeated until the release button is half-pressed (step S14). When the release button is half-pressed, it is judged whether the results of the latest S0 metering are all right (i.e., whether the S0 metering is performed when the aperture is stable) (step S15). If they are all right, the exposure for the still image is calculated (step S19).

If it is judged in step S15 that the S0 metering results are not all right, it is judged whether all four times of metering in the S0 state or part of them remain to be performed (step S16).

Figure 17:
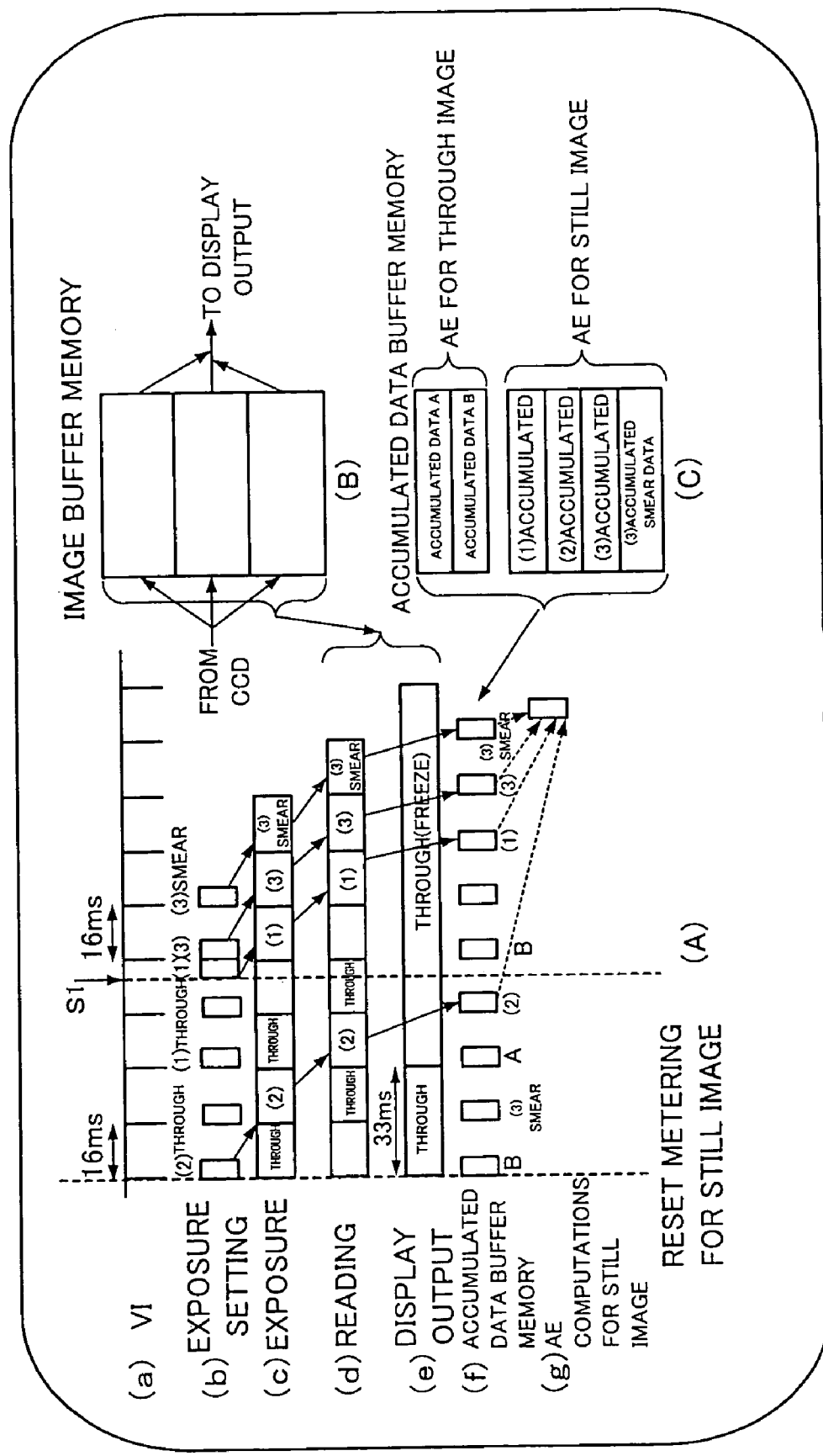
FIG. 17 is a diagram showing a sequence in which part of four times of metering for a still image is finished and another part of them is unfinished before a half press.

If part of the metering is finished, the flow goes to step S17, where the rest of the metering is performed after an S1 press as shown in FIG. 17.

FIG. 17 is a diagram showing a sequence in which part of four times of metering for a still image is finished and another part of them is unfinished before a half press.

FIG. 17 shows a sequence in which metering for a still image is reset once due to an aperture change before an S1 press and then S1 is pressed at the completion of only the metering for the accumulated data (2). In this case, after an S1 press, metering for the accumulated data (1) and (3) and accumulated smear data (3) is performed, and then AE computations for the still image are performed based on the four times of metering including the metering for the accumulated data (2) performed before the S1 press (step S19 in FIG. 16).

If it is judged in step S16 in FIG. 16 that none of the four times of metering in the S0 state is finished, the flow goes to step S18, where regular S1 metering is performed.

Figure 18:
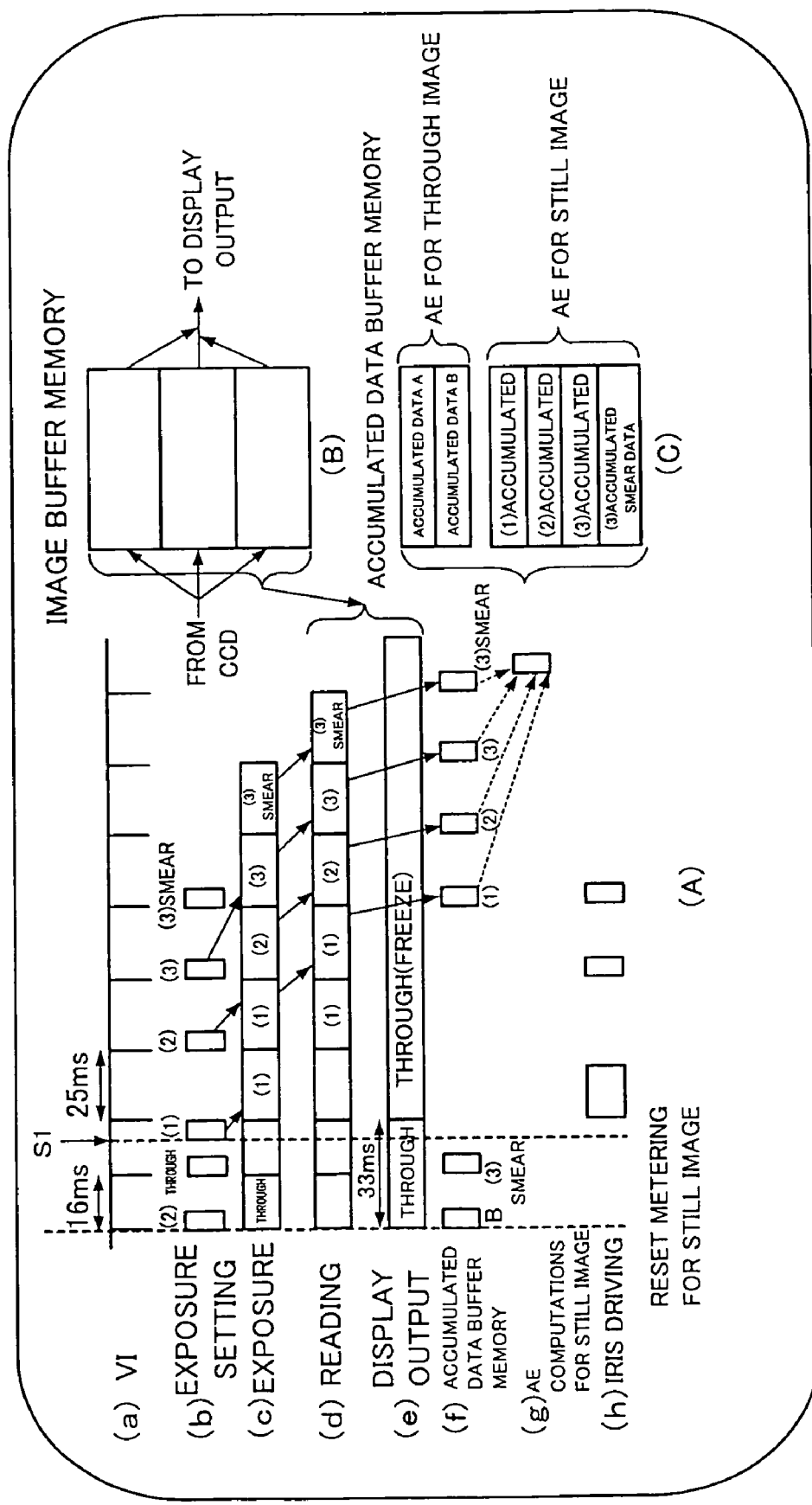
FIG. 18 is a diagram showing a sequence in which all four times of metering for a still image is unfinished at the time of a half press.

FIG. 18 is a diagram showing a sequence in which all four times of metering for a still image is unfinished at the time of a half press.

FIG. 18 shows a sequence in which metering for a still image is reset once due to an aperture change before an S1 press and then S1 is pressed before none of the four times of metering is finished. In this case, regular S1 metering is performed and then the exposure for the still image is calculated (step S19 in FIG. 16), where the regular S1 metering is the same as the AE metering performed when the quick shooting mode is off (described with reference to FIG. 6).

Figure 19:
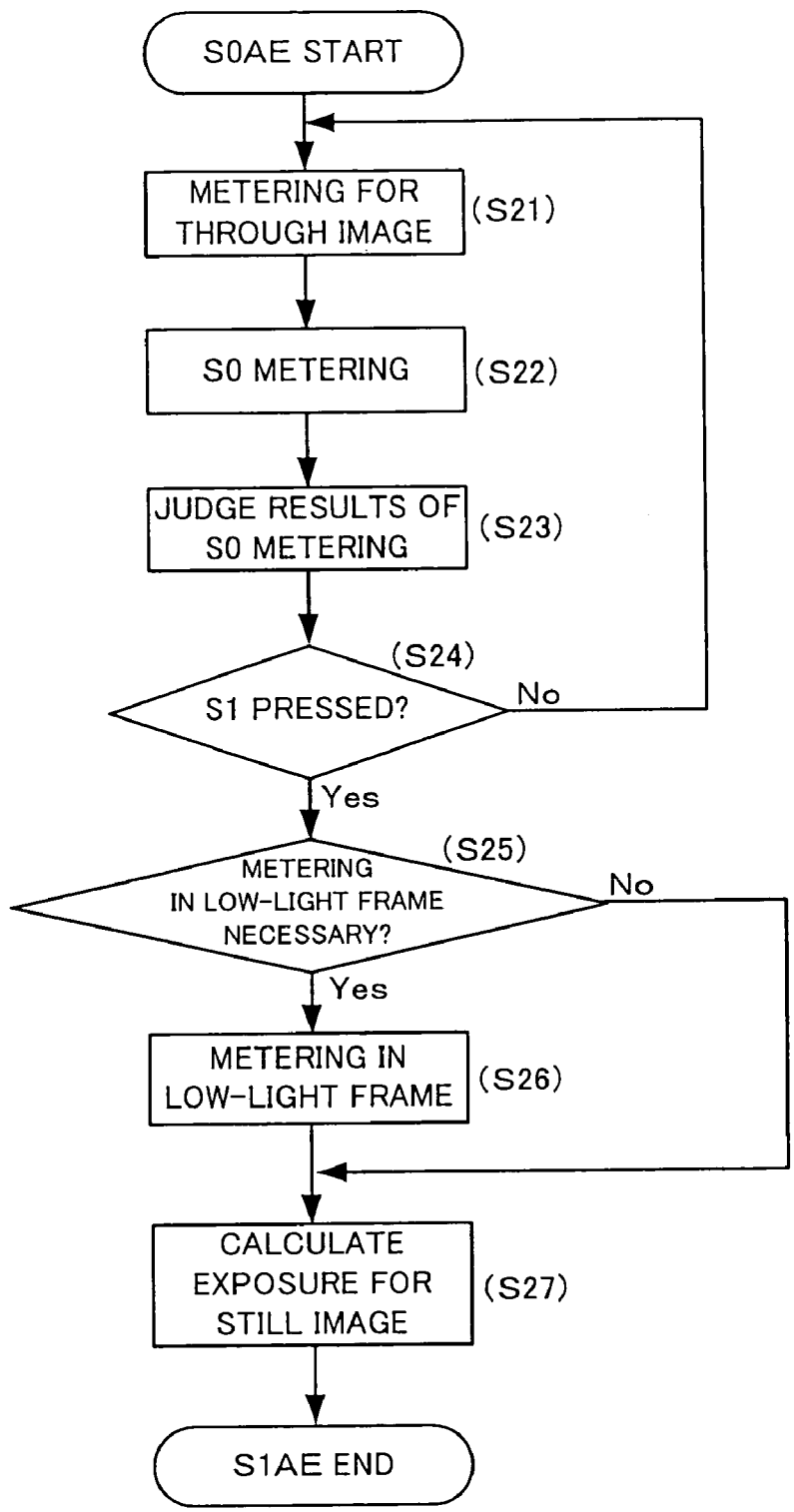
FIG. 19 is a flowchart showing a metering process which involves low-light still-image metering as in the case of a night mode.

FIG. 19 is a flowchart showing a metering process which involves low-light still-image metering as in the case of a night mode.

The digital camera according to this embodiment provides shooting modes, such as a night mode, intended for still-image shooting in a dark subject field. These modes involve metering in a low-light range in which exposure time is too short for metering within one frame in the S0 state even if sensitivity is enhanced by increasing the amplifier gain or mixing pixels. FIG. 19 shows a metering process used to accommodate such a situation.

The flow goes through metering for a through image, S0 metering, and judgment of the S0 metering results (steps S21 to S23) as in the case of steps S11 to S14 in FIG. 16. These steps are repeated until S1 is pressed (step S24).

When S1 is pressed, it is judged whether metering in a low-light frame is necessary (step S25). The judgment is made based on the current shooting mode (e.g., whether or not the night mode is selected). The low-light frame is intended for metering in a low-light range and allows an extended exposure time.

If it is judged in step S25 that low-light frame metering is not necessary, the flow goes to step S27, where the exposure for the still image is calculated.

On the other hand, if it is judged that low-light frame metering is necessary, the flow goes to step S26, where metering is performed using a low-light frame and then the exposure for the still image is calculated based on five times of metering in total including the metering in the low-light frame (step S27).

Figure 20:
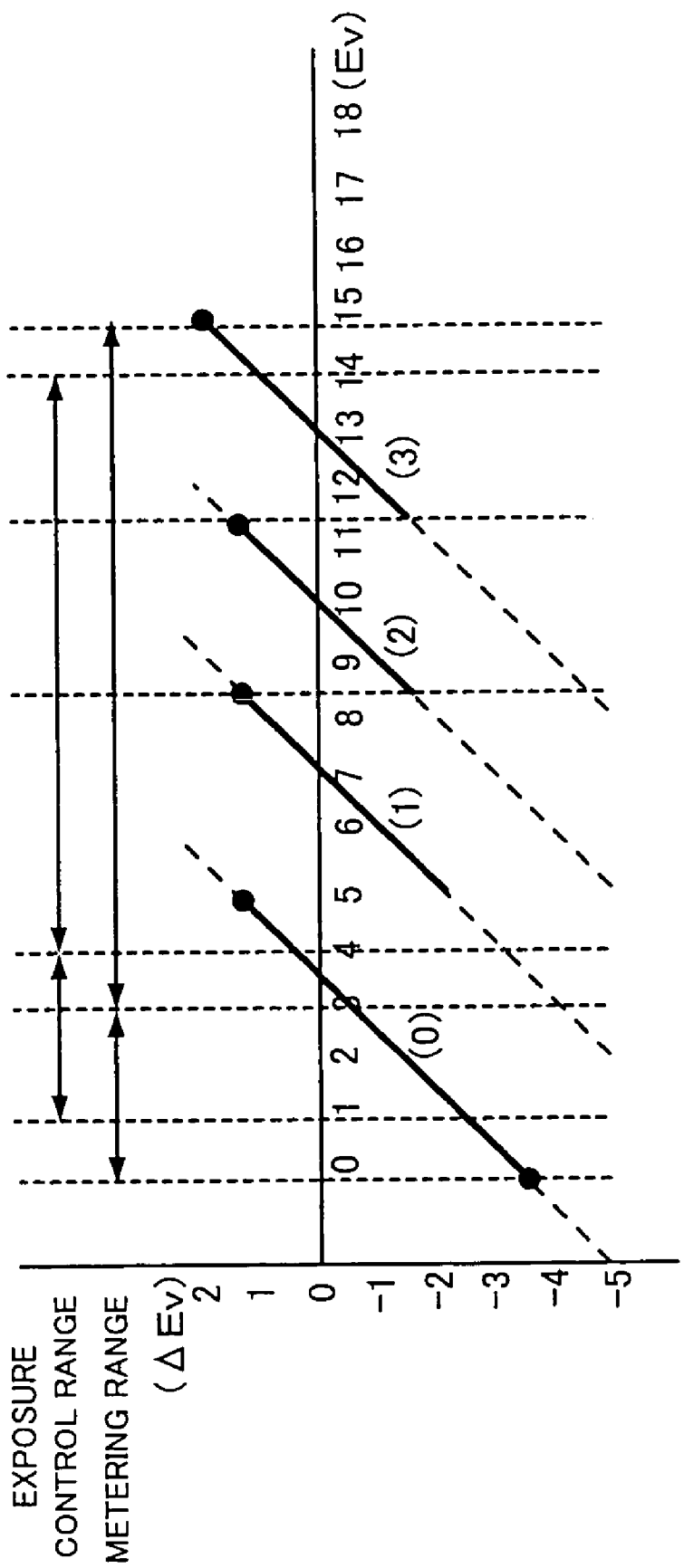
FIG. 20 is a metering diagram when low-light frame metering is used.

FIG. 20 is a metering diagram when low-light frame metering is used.

The figure shows a metering diagram at an aperture of F2.8. Graph line (0) in the metering diagram represents low-light frame metering. In the case of low-light frame metering, adjustments are made so that EV 3.5 will be a correct exposure, an exposure is made, and metering is performed within a range of EV 0 to EV 5.

Figure 21:
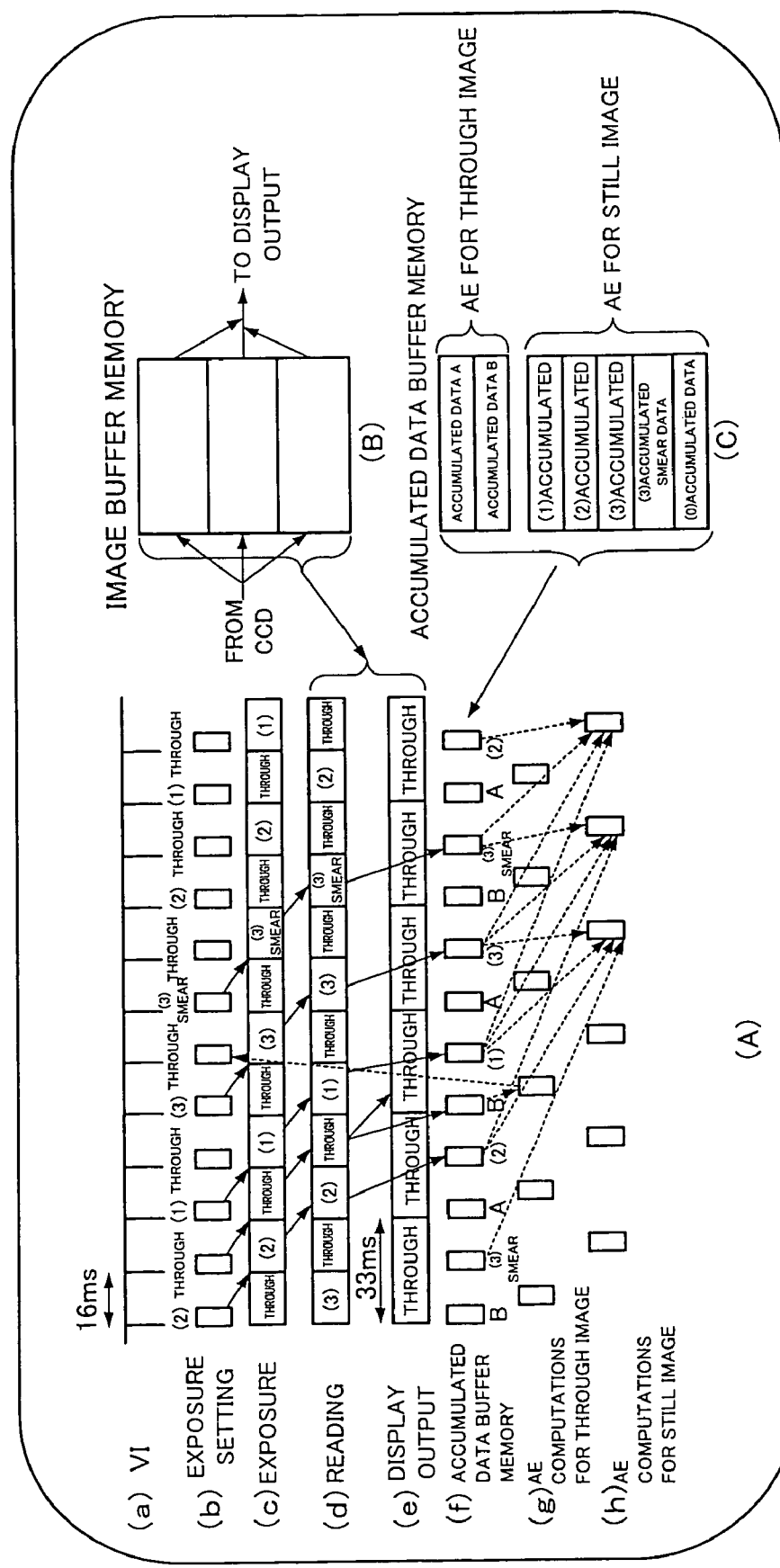

FIG. 21 is a diagram showing a through image sequence performed in a shooting mode such as a night mode which involves low-light frame metering, when the quick shooting mode is on.

The sequence shown in FIG. 21 is the same as the through image sequence shown in FIG. 8, and thus redundant description thereof will be omitted. As accumulated data buffer memory for AE for a still image, a storage area for accumulated data (hereinafter referred to as accumulated data (0)) of low-light frame metering is provided in addition to the accumulated data storage areas for four frames described above: the accumulated data (1), accumulated data (2), accumulated data (3), and accumulated smear data (3). However, in the through image sequence shown in FIG. 21, the storage area for the accumulated data (0) remains empty.

Figure 22:
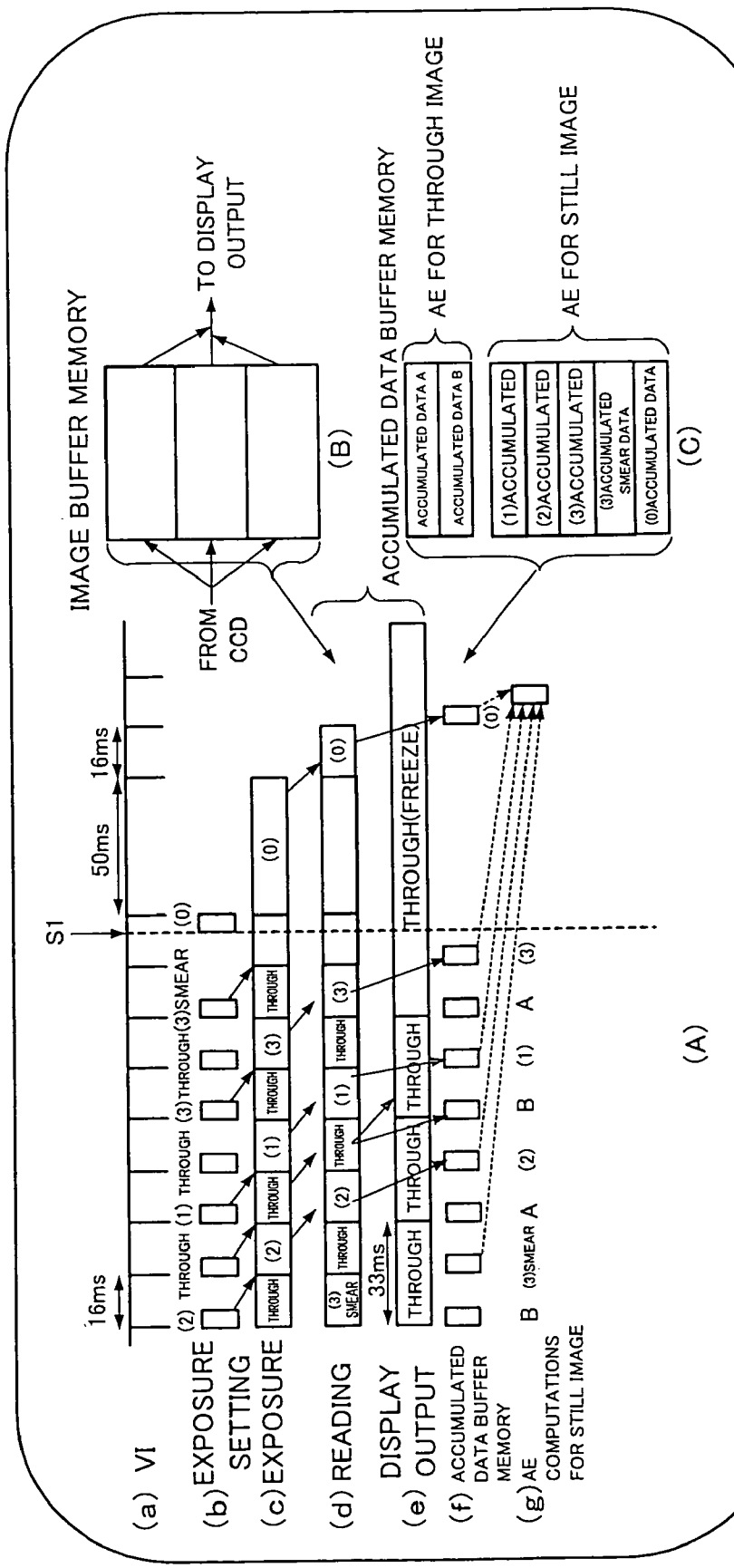

FIG. 22 is a diagram showing a through image sequence performed when S1 is pressed in a shooting mode such as a night mode which involves low-light frame metering, when the quick shooting mode is on.

After a press of S1, exposure settings are made for low-light frame metering (metering for the accumulated data (0)), a long exposure is made over 50 ms for the low-light frame metering, the resulting data is readout, the accumulated data (0) is determined, and the exposure for the still image is calculated based on five times of metering including four times of metering before the S1 press: the accumulated smear data (3), accumulated data (3), accumulated data (2), and accumulated data (1).

By performing low-light frame metering after a S1 press in this way, it is possible to avoid altering the frame rate of the through image, and thus avoid causing the user to have a sense of incongruity.

Figure 23:
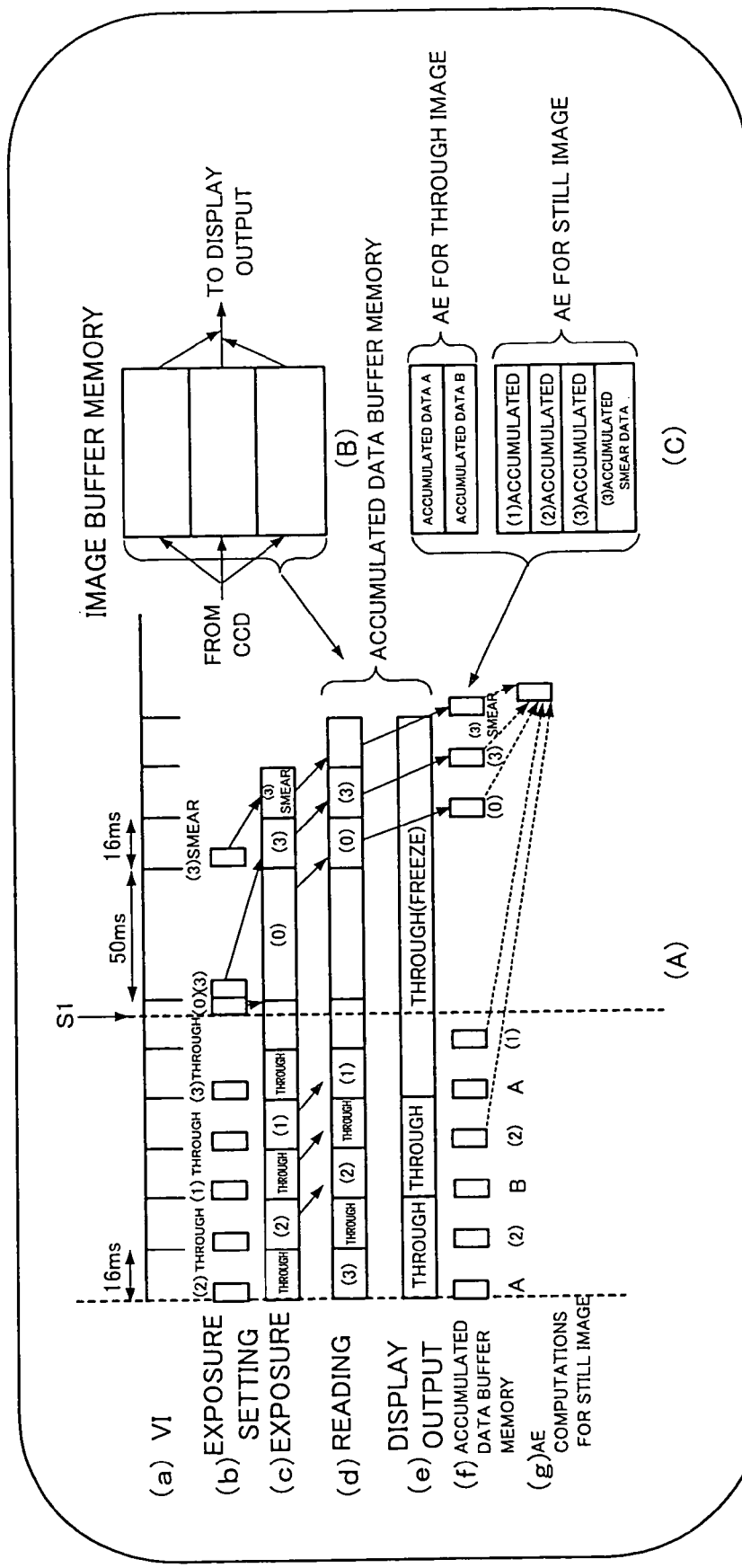
FIG. 23 is a diagram showing a sequence performed in a shooting mode such as a night mode which involves low-light frame metering, when the quick shooting mode is on if S0 metering is not completed at the time of an S1 press due to an aperture change during through image display.

FIG. 23 is a diagram showing a sequence performed in a shooting mode such as a night mode which involves low-light frame metering, when the quick shooting mode is on if S1 metering is not completed at the time of an S1 press due to an aperture change during through image display.

FIG. 23 shows a sequence in which metering for a still image is reset once due to an aperture change and then S1 is pressed at the completion of the metering for the accumulated data (1) and (2). In this case, after an S1 press, low-light frame metering (metering for the accumulated data (0)) is performed, metering for the accumulated data (3) and metering for the accumulated smear data (3) are performed, and then AE computations for the still image are performed based on the five times of metering (five sets of accumulated data) including the metering for the accumulated data (2) and (1)

before the S1 press and the accumulated data (0), accumulated data (3), and accumulated smear data (3) after the S1 press.

In this way, according to this embodiment, AE metering for a still image is performed in the S0 state (before an S1 press) and additional metering is performed after the S1 press if part of the AE metering for the still image is not completed or if the current shooting mode is a night mode or the like which involves low-light metering.

This makes it possible to implement a sequence which harmonizes with through image display while minimizing the possibility of missing the right moment to take a photo.

Although a digital camera which has the appearance shown in FIG. 1 has been described above, the present invention is applicable not only to image-taking apparatus which have an appearance of a "camera," but also, for example, to camera-equipped cell phones and the like.

What is claimed is:

1. An image-taking apparatus which is equipped with a release button and shoots a still image when the release button is pressed, wherein:
   the release button is a two-step type which lends itself to a half press and full press; and
   the image-taking apparatus comprises:
   through image display means which displays a through image which is moving images for display before a half press,
   metering means which performs both metering for a through image and metering for a still image before a half press, the metering for a still image covering a wider luminance range than the metering for a through image,
   in-focus position detecting means which detects an in-focus position in response to a half press, and
   shooting means which shoots a still image in response to a full press.

2. The image-taking apparatus according to claim 1, wherein the metering means has a second metering mode in which metering for a through image is performed before a half press and metering for a still image is performed after the half press, in addition to a first metering mode in which both metering for through image display and metering for a still image are performed before a half press.

3. The image-taking apparatus according to claim 2, wherein the metering means generates a series of image frames in the first metering mode by placing one each of a plurality of metering frames with cyclically differing amounts of exposure between adjacent through image frames for through image display, and performs the metering for a still image using a set of light measurements taken over a round of metering frames based on one metering frame in the series of image frames.

4. The image-taking apparatus according to claim 2, comprising a variable aperture member which limits quantity of photographic light, wherein if there is an aperture change in the first metering mode, the metering means discards results of light measurements obtained before the aperture change and performs metering for a still image based only on metering frames after the aperture change.

5. The image-taking apparatus according to claim 2, wherein in the first metering mode, the metering means performs the metering for a through image based on through image frames in the series of image frames.

6. The image-taking apparatus according to claim 3, wherein the metering means determines in the first metering mode whether the metering for a still image is finished in response to a half press, and takes only unfinished light measurements after the half press if the metering is not finished.

7. The image-taking apparatus according to claim 3, wherein:
   the shooting means can shoot in a plurality of shooting modes including a low-light shooting mode which requires metering of a low-light range in which metering based on the metering frames is not possible; and
   the metering means performs metering in the low-light range after a half press in the low-light shooting mode which is the first metering mode.

8. The image-taking apparatus according to claim 3, wherein an automatic sensitivity setting mode is provided which automatically switches between sensitivity for still-image shooting and sensitivity for through image generation and which maintains constant sensitivity while a round of metering frames are generated in the first metering mode.

9. The image-taking apparatus according to claim 4, wherein the shooting means has an aperture-lock shooting mode in which a still image is shot by maintaining the aperture determined at the time of a half press.

10. The image-taking apparatus according to claim 2, further comprising a variable aperture member which limits quantity of photographic light, wherein in the first metering mode, the metering means performs metering for a through image and metering for a still image while maintaining the aperture of the aperture member constant.

11. The image-taking apparatus according to claim 8, further comprising a variable aperture member which limits quantity of photographic light, wherein, in the first metering mode, the metering means performs metering for a through image and metering for a still image while maintaining the aperture of the aperture member constant.

* * * * *